(12) United States Patent
Giust

(10) Patent No.: US 9,003,549 B2
(45) Date of Patent: Apr. 7, 2015

(54) ANALYSIS OF AN ANALOG PROPERTY OF A SIGNAL

(76) Inventor: Gary K. Giust, Santa Clara, CA (US)

( * ) Notice: Subject to any disclaimer, the term of this patent is extended or adjusted under 35 U.S.C. 154(b) by 717 days.

(21) Appl. No.: 13/205,078

(22) Filed: Aug. 8, 2011

(65) Prior Publication Data

US 2012/0053953 A1 Mar. 1, 2012

Related U.S. Application Data

(60) Provisional application No. 61/378,465, filed on Aug. 31, 2010.

(51) Int. Cl.
| | | |
|---|---|---|
| G06F 7/04 | (2006.01) | |
| G06F 17/30 | (2006.01) | |
| H04N 7/16 | (2011.01) | |
| G06Q 30/02 | (2012.01) | |

(52) U.S. Cl.
CPC ................................. *G06Q 30/0278* (2013.01)

(58) Field of Classification Search
USPC .......................................................... 726/27
See application file for complete search history.

(56) References Cited

U.S. PATENT DOCUMENTS

| | | | |
|---|---|---|---|
| 5,107,849 A | 4/1992 | Bellin et al. | |
| 6,137,283 A | 10/2000 | Williams et al. | |
| 6,263,290 B1 | 7/2001 | Williams et al. | |
| 6,298,315 B1 * | 10/2001 | Li et al. | ........................... 702/180 |
| 6,356,850 B1 * | 3/2002 | Wilstrup et al. | ................ 702/69 |
| 6,529,842 B1 * | 3/2003 | Williams et al. | ................ 702/66 |
| 6,671,334 B1 | 12/2003 | Kuntz et al. | |
| 6,795,496 B1 | 9/2004 | Soma et al. | |
| 6,799,144 B2 | 9/2004 | Li et al. | |
| 6,832,172 B2 * | 12/2004 | Ward et al. | ....................... 702/69 |
| 6,853,933 B2 | 2/2005 | Tan et al. | |
| 6,898,535 B2 | 5/2005 | Draving | |
| 7,043,393 B2 * | 5/2006 | Fuller et al. | .................... 702/127 |

(Continued)

FOREIGN PATENT DOCUMENTS

| | | |
|---|---|---|
| EP | 1 504 271 B1 | 11/2006 |
| EP | 1 508 813 B1 | 1/2007 |

OTHER PUBLICATIONS

M Shinagawa; Jitter analysis of high-speed sampling systems;25, No. 1, February 1990; ieeexplore.ieee.org; pp. 220-224.*

(Continued)

*Primary Examiner* — Mohammad W Reza
*Assistant Examiner* — Monjour Rahim
(74) *Attorney, Agent, or Firm* — Miller Patent Services; Jerry Miller

(57) ABSTRACT

A third party provides an analysis of an analog signal property derived from an electronic device. A data set describing an analog signal property is obtained. The data set is derived from at least one measurement on the signal. A permission set based on data received from a supplier entity is maintained. A consumer entity having permissions are permitted access to information computed from the data set. A consumer input from the consumer entity is received. The consumer input represents a request for the analysis result. A determination is made based on permissions that the consumer entity is permitted access to the computed information. An analysis result from the data set is computed after receiving the consumer input. The analysis result is provided to the consumer entity. This abstract is not to be considered limiting, since other embodiments may deviate from the features described in this abstract.

46 Claims, 9 Drawing Sheets

(56) References Cited

U.S. PATENT DOCUMENTS

| | | | |
|---|---|---|---|
| 7,050,923 B2 | 5/2006 | Fuller, III et al. | |
| 7,254,168 B2 | 8/2007 | Guenther | |
| 7,339,984 B1 | 3/2008 | Daou | |
| 7,386,409 B2 | 6/2008 | Mueller et al. | |
| 7,388,937 B1 | 6/2008 | Rodger et al. | |
| 7,450,043 B2 | 11/2008 | Pupalaikis | |
| 7,720,660 B2* | 5/2010 | Bolcato et al. | 703/13 |
| 8,291,069 B1* | 10/2012 | Phillips | 709/224 |
| 2002/0083080 A1* | 6/2002 | Classen | 707/104.1 |
| 2003/0004664 A1* | 1/2003 | Ward et al. | 702/69 |
| 2003/0130830 A1* | 7/2003 | Gist et al. | 703/19 |
| 2004/0205556 A1 | 10/2004 | Abramovitch | |
| 2004/0210790 A1 | 10/2004 | Moon et al. | |
| 2005/0218881 A1* | 10/2005 | Tanaka et al. | 324/76.11 |
| 2005/0232345 A1 | 10/2005 | Ward et al. | |
| 2005/0243950 A1 | 11/2005 | Laquai et al. | |
| 2005/0246113 A1 | 11/2005 | Montijo | |
| 2006/0045175 A1 | 3/2006 | Draving et al. | |
| 2006/0045226 A1 | 3/2006 | Li et al. | |
| 2006/0222128 A1* | 10/2006 | Raphaeli | 375/355 |
| 2006/0251200 A1* | 11/2006 | Miller | 375/371 |
| 2007/0022320 A1* | 1/2007 | Flocken et al. | 714/37 |
| 2007/0150218 A1 | 6/2007 | Akimoto | |
| 2009/0018996 A1* | 1/2009 | Hunt et al. | 707/2 |
| 2010/0048142 A1* | 2/2010 | Hou et al. | 455/67.13 |
| 2010/0318569 A1* | 12/2010 | Munday | 707/783 |
| 2011/0286506 A1* | 11/2011 | Libby et al. | 375/224 |
| 2012/0239433 A1* | 9/2012 | Kenedy et al. | 705/3 |

OTHER PUBLICATIONS

Anonymous, "Agilent Technologies InfiniiVision 6000L Series Low-Profile Oscilloscopes," Agilent Technologies Data Sheet, Feb. 28, 2010.

Anonymous, "10 Gigabit Ethernet Consortium XAUI Electrical Test Suite, Version 1.1" Dec. 28, 2004.

Analui, "Data Dependent Jitter in Serial Communications," IEEE Transactions on Microwave Theory and Techniques, vol. 53, No. 11, p. 1, Nov. 2005.

Andrews, James R., "Removing Jitter from Picosecond Pulse Measurements," Picosecond Pulse Labs, Sep. 2009.

Anonymous, "Advanced Jitter, Noise and BER Analysis Software for TDS/CSA8000 Series Sampling Oscilloscopes," Tektronix Datasheet, Updated Jul. 2005.

Anonymous, "Agilent E5052B Signal Source Analyzer 10 MHz to 7 Ghz, 26.5 Ghz, or 110 Ghz Data Sheet," Agilent Technologies, Mar. 11, 2009.

Anonymous, "Agilent PSA Series Spectrum Analyzers Data Sheet," Agilent Technologies, Nov. 15, 2008.

Anonymous, "Analysis Software for Oscilloscopes, 80SJARB and 80SJNB Data Sheet," Tektronix Datasheet, Updated Aug. 5, 2009.

Anonymous, "Common Electrical I/O (CEI)—Electrical and Jitter Interoperability Agreements for 6G+ bps and 11G+ bps I/O," Optical Internetworking Forum (OIF), IA #OIF-CEI-02.0, Feb. 28, 2005.

Anonymous, "Converting Phase Noise (dBc/Hz) to Phase Jitter (ps RMS) for Large Data Sets," JitterTime Consulting, © 2006-2009.

Anonymous, "Evaluating Oscilloscope Vertical Noise Characteristics," Application Note, Agilent Technologies, Oct. 1, 2009.

Anonymous, "Infiniium 90000 Series Oscilloscopes Data Sheet," Agilent Technologies, Oct. 1, 2009.

Anonymous, "Infiniium 9000 Series Oscilloscopes," Agilent Technologies Datasheet, Document 5989-7819EN, Feb. 9, 2010.

Anonymous, "Infiniium DCA-J Agilent 86100C Wide-Bandwidth Oscilloscope Mainframe and Modules, Technical Specifications," Agilent Technologies, Apr. 23, 2010.

Anonymous, "INF-8077i 10 Gigabit Small Form Factor, Pluggable Module," SFF Committee, Rev. 4.5, Aug. 31, 2005.

Anonymous, "MtronPTI's Oscillator Jitter Basics," MtronPTI, p. 1, ebook published on ebookbrowse, Nov. 12, 2010.

Anonymous, "N5410A Fibre Channel Compliance Application for Infinium Series Oscilloscopes," Agilent Technologies Datasheet, Document 5989-4209EN, Oct. 1, 2009.

Anonymous, "N5431A XAUI Electrical Validation Application for Infiniium Oscilloscopes and Digital Signal Analyzers," Agilent Technologies Datasheet, Document 5989-6151EN, Jun. 11, 2008.

Anonymous, "Physical Medium Dependent Sublayer and Baseband Medium, Type 10GBASE-KR," IEEE 802.3-2008 Clause 72, pp. 417-451, 2008.

Anonymous, "Preventing and Attacking Measurement Noise Problems," White Paper, Campbell Scientific, Inc., 2001.

Anonymous, "RabidIO Part 6: LP-Serial Physical Layer Specification Rev. 2.0," RapidIO Trade Association, Rev. 2.0.1, Chapter 8, pp. 187-228, 2008.

Anonymous, "SFF-8431 Specifications for Enhanced Small Form Factor Pluggable Module SFP+," SFF Committee, Rev. 4.1, Jul. 6, 2009.

Anonymous, "Spectral Analysis Using a Deep-Memory Oscilloscope Fast Fourier Transform (FFT)," Application Note, Agilent Technologies, 2001.

Anonymous, "Synchronous Optical Network (SONET) Transport Systems: Common Generic Criteria," Telcordia, GR-253_CORE, Issue 4, Dec. 2005.

Anonymous, "Understanding and Characterizing Timing Jitter," Figure 4.2, p. 13, Tektronix, Inc., 2003.

Anonymous, "XGMII Extender Sublayer (XGXS) and 10 Gigabit Attachment Unit Interface (XAUI)," IEEE 802.3-2008 Clause 47, pp. 211-223, 2008.

Guist, Gary, "Added Resistor Preserves Crystal Oscillator's Low Output Jitter," Planet Analog, Jun. 17, 2007.

Giust, Gary, "Jitter Peaking and PLLs," Signal Integrity, Sep. 13, 2007.

Giust, Gary, "Setting Up Your Oscilloscope to Measure Jitter," Signal Integrity, Oct. 11, 2007.

Ham, Bill, "Fibre Channel—Methodologies for Jitter and Signal Quality Specification—MJSQ," T11.2/Project 1316-DT/REV 14.1, Jun. 5, 2005.

* cited by examiner

| SUPPLIER ENTITY | DATA SET | ORG1 | ORG2 | ORG3 | ORG4 | ORG5 | PERMISSION SET |
|---|---|---|---|---|---|---|---|
| ORG1 | DS1 | Y | N | Y | Y | N | 461 (PS1) |
| ORG2 | DS2 | N | Y | Y | N | Y | 462 (PS2) |
| ORG3 | DS3 | Y | N | Y | N | Y | 260 (PS3) |
| ORG2 | DS4 | Y | Y | Y | Y | Y | 463 (PS4) |
| ORG3 | DS5 | Y | N | Y | N | Y | |

*FIG. 4*

ANALYSIS OF AN ANALOG PROPERTY OF A SIGNAL

CROSS REFERENCE TO RELATED DOCUMENTS

This application claims priority benefit of U.S. Provisional Patent application 61/378,465 filed Aug. 31, 2010.

COPYRIGHT AND TRADEMARK NOTICE

A portion of the disclosure of this patent document contains material which is subject to copyright protection. The copyright owner has no objection to the facsimile reproduction of the patent document or the patent disclosure, as it appears in the Patent and Trademark Office patent file or records, but otherwise reserves all copyright rights whatsoever. Trademarks are the property of their respective owners.

BACKGROUND

In an effort to select a manufacturer for an electrical device, a potential customer may request supporting data related to an analog performance of the electrical device from each of several competing manufacturers of the electrical device. However, a direct comparison of the supporting data provided by each of the competing manufacturers may be misleading due to possible differences between manufacturers in developing the supporting data, such as: differences in equipment or settings of the equipment used to measure the electronic device; differences in mathematical algorithms used to derive the supporting data from measurement results; differences in the measurement environment (e.g. temperature, sources of noise); differences in configuring the electronic device for operation (e.g. power supply voltages, output frequency or data rate, and/or other configurable options or features), and a natural desire of the manufacturer to want the supporting data to appear favorable.

BRIEF DESCRIPTION OF THE DRAWINGS

Certain illustrative embodiments illustrating organization and method of operation, together with objects and advantages may be best understood by reference to the detailed description that follows taken in conjunction with the accompanying drawings in which:

FIG. 4 depicts an example permission set in accordance with certain embodiments consistent with the present invention.

DETAILED DESCRIPTION

Figure 1:
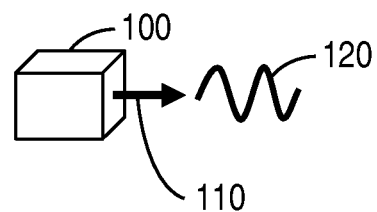
FIG. 1 depicts an example electronic device in accordance with certain embodiments consistent with the present invention.

While this invention is susceptible of embodiment in many different forms, there is shown in the drawings and will herein be described in detail specific embodiments, with the understanding that the present disclosure of such embodiments is to be considered as an example of the principles and not intended to limit the invention to the specific embodiments shown and described. In the description below, like reference numerals are used to describe the same, similar or corresponding parts in the several views of the drawings. Nothing in this document is intended to be construed as an admission of prior art unless explicitly designated as such using the words "prior art".

Reference throughout this document to "one embodiment", "certain embodiments", "an embodiment", "an example", "an implementation" or similar terms means that a particular feature, structure, or characteristic described in connection with the embodiment, example or implementation is included in at least one embodiment, example or implementation of the present invention. Thus, the appearances of such phrases or in various places throughout this specification are not necessarily all referring to the same embodiment, example or implementation. Furthermore, the particular features, structures, or characteristics may be combined in any suitable manner in one or more embodiments, examples or implementations without limitation.

The terms "a" or "an", as used herein, are defined as one or more than one. The term "plurality", as used herein, is defined as two or more than two. The term "another", as used herein, is defined as at least a second or more. The terms "including" and/or "having", as used herein, are defined as comprising (i.e., open language). The term "coupled", as used herein, is defined as connected, although not necessarily directly, and not necessarily mechanically. The term "program" or "computer program" or similar terms, as used herein, is defined as a sequence of instructions designed for execution on a computer system. A "program", or "computer program", may include a subroutine, a function, a procedure, an object method, an object implementation, in an executable application, an applet, a servlet, a source code, an object code, a shared library/dynamic load library and/or other sequence of instructions designed for execution on a computer system. The term "processor", "controller", "CPU", "computer" and the like as used herein encompasses both hard programmed, special purpose, general purpose and programmable devices and may encompass a plurality of such devices or a single device in either a distributed or centralized configuration without limitation.

The use of terminology herein for first, second, and third to describe an element is to be merely interpreted as a label, and does not imply timing or other specific attributes. The term "or" as used herein is to be interpreted as an inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

This application relates generally to methods and apparatuses for analyzing a signal, and specifically to methods and apparatuses for analyzing an analog property of a signal derived from an electronic device.

The term "signal" is used herein to describe a continuous-time signal, such as a real-world signal. In a mathematical abstraction, the domain of a continuous-time signal is the set of real numbers (or some interval thereof). The terminology "analog property of a signal" as used herein therefore includes any attribute, quality, or characteristic of the signal that can express any value along a continuous scale (or some interval thereof). The signal may include small fluctuations that are meaningful.

The term "electronic device" is used herein to describe a device that utilizes the properties of electrons for accomplishing in whole or in part its purpose. An electronic device may additionally utilize light, such as in optoelectronic (optical transceiver modules) and electro-optic (e.g. image sensors) devices; sound, such as in surface-acoustic wave (SAW)-based clock oscillator devices; or mechanical motion, such as in micro-electro-mechanical (MEMS)-based clock oscillator devices. Electronic devices well suited for this application include without limitation integrated circuits (ICs), semiconductor chips, packaged semiconductor chips, electronic components and modules, transceivers, transponders, serializers and deserializers (e.g. SERDES), clock timing sources, signal (e.g. pulse, pattern, data) sources, electronic systems and components of such systems, printed circuit boards (PCBs), and PCB assemblies.

An analog property of a signal can be difficult to measure and analyze, especially as the amplitude of noise in the signal approaches that of the signal. Noise may be introduced from the environment during measurement (e.g. ground loops, crosstalk, electrical and magnetic fields, etc.). Also, the measurement equipment itself can introduce artifacts into the measured data. Furthermore, differences in the setup of the measurement equipment and the equipment's connection to a contact point to access the signal can translate into variations observed in measurement results obtained between different measurement facilities, even if the same electronic device is tested. Some analog properties of a signal may include phase noise, jitter, and spectral density.

A potential customer intending to analyze and compare the analog performance of a product sold by several competing manufacturers may have the following options:

A. Request each manufacturer to provide the analog performance data related to their product for the potential customer to analyze.

B. Request each manufacturer to provide their product for the potential customer to measure and analyze its analog performance.

C. Request a report from the manufacturer showing the analog performance data obtained by an independent test laboratory.

Option A is the most common option. Here, the manufacturer may create one report and distribute it to multiple potential customers, but there are several drawbacks. For example, comparing analog performance data between different manufacturers is difficult due to variations in equipment used to collect the data, variations in equipment settings used to collect the data (for example, if the same equipment is used), variations in environmental effects on the measurement data, and competing interests between the potential customer and the manufacturer (e.g. the potential customer has no knowledge whether the manufacturer has tested a "golden" device that exhibits above average analog performance). Also, each potential customer may have a slightly different or non-standard application requiring knowledge of some aspect related to an analog performance of the electronic device that the single report provided by the manufacturer does not address.

Option B results in better comparisons between different manufacturers' products because variations due to the environment, and equipment selection and setup are minimized. One tradeoff in option B is that the manufacturer must supply and train numerous potential customers to use and test their electronic device, which increases material cost and customer support for the manufacturer. The potential customer must also invest time and money to produce results, including maintaining and/or renting any necessary equipment required for measuring the electronic device. Also, any result derived by the potential customer may be suspected by the manufacturer as inaccurate if the manufacturer did not oversee the process leading to the result.

Option C offers the combined advantages of options A and B, plus eliminates the above mentioned competing interest concerns between the potential customer and the manufacturer (assuming the independent test laboratory provides unbiased and accurate results). However, to recover the investment needed to create a test, the independent test lab may focus testing around popular industry standards to attract a wide audience for the test. Option C is thus typically the least available option, especially for applications that are not standardized by industry organizations or are related to uncommon industry standards. Another disadvantage is that the report derived from the independent test laboratory may be static in nature, and therefore not allow the potential customer to interact with, analyze, and/or post-process the original data derived from the electronic device to gain insight into the nature of the analog property, which inhibits the potential customer's ability to assess the suitability of the electronic device for the intended application. To keep test costs low, the amount of information provided by the independent test lab may be limited.

It is therefore observed that a need exists to provide an unbiased analysis of an analog property in a signal for non-standard or uncommon applications requiring great depth of information.

In general, a clock timing signal oscillates between a high-level state and low-level state, and the time between recurring edges of the clock timing signal is often periodic or pseudo-periodic. The clock timing signal has edges with a rising slope direction, and edges with a falling slope direction, and these edges may be used to control the timing of actions. For many applications, the clock timing signal is ideally a periodic wave such as a sine wave or a square wave, but the clock timing signal in practice may contain characteristics that make the waveform imperfect and therefore are referred to herein as "pseudo-periodic", with such imperfections including variations in time of amplitude, pulse width, period, frequency, rise time, or fall time, for example. Furthermore, some imperfections are sometimes intentionally introduced onto the clock timing signal. For example, spread-spectrum technology introduces a controlled amount of frequency modulation onto the clock timing signal to minimize electro-magnetic interference (EMI) emissions. The clock timing signal is normally used to define a time reference for the movement of data within a system. A clock timing signal normally carries information in its edges.

The clock timing signal is generally derived from a clock timing source. The following are non-limiting examples of clock timing sources that may output at least one clock timing signal: crystal oscillator (XO), voltage-controlled oscillator (VCO), voltage-controlled crystal oscillator (VCXO), voltage-controlled surface-acoustic wave (SAW) oscillator (VCSO), oven-controlled crystal oscillator (OCXO), temperature-controlled crystal oscillator (TCXO), programmable clock oscillator, phase locked loop (PLL)-based clock synthesizer, fractional-N clock synthesizer, SAW oscillator, micro-electro-mechanical systems (MEMS) oscillator, temperature-compensated MEMS oscillator (TCMO), clock-recovery unit (CRU), clock-generation integrated circuit (IC), distribution-buffer IC, jitter-attenuation IC, frequency-translation IC, clock-multiplier IC, spread-spectrum clock IC, clock IC, clock module, clock circuit, and a semiconductor chip that outputs the clock timing signal.

A "technical standard" is defined as used herein as a documented set of requirements defining in whole or in part a technology. The scope of the discussion herein includes technical standards associated with serial-data transmission applications as well as other applications. The documented set of requirements may establish one or more technical criteria, specifications, methods, processes, and/or practices. More specifically, the technical standard includes one or more standard specifications, where each standard specification may comprise an explicit set of requirements for an item, component, system, and/or service. For example, a technical standard associated with a serial-data transmission application may incorporate one or more specifications, criteria, processes, practices, methods, details, and/or requirements relating to jitter, phase noise, or spectral density.

The technical standard may be developed by a standard body organization, or one or more public and/or private companies and/or organizations. The technical standard may be administered, written, maintained, or provided by at least one or more of the following organizations without limitation: Society of Motion Picture Television Engineers (SMPTE), Institute of Electrical and Electronics Engineers (IEEE), Peripheral Component Interconnect Special Interest Group (PCI-SIG), Telcordia Technologies Inc., American National Standards Institute (ANSI), International Telecommunication Union (ITU), Optical Internetworking Forum (OIF), Serial Advanced Technology Attachment International Organization (SATA-IO), International Committee for Information Technology Standards (INCITS), Common Public Radio Interface (CPRI) Cooperation, Infiniband Trade Organization, RapidIO Trade Association, Small Form Factor (SFF) Committee, Ethernet Alliance, Video Electronics Standards Association (VESA), High-Definition Multimedia Interface (HDMI) Licensing LLC, HyperTransport Consortium, InfiniBand Trade Association, International Electrotechnical Commission (IEC), and Universal Serial Bus (USB) Implementer's Forum (USB-IF). This list is not intended to be all inclusive, but is provided by way of example. Additionally, technical standards may be publically available in published form or unpublished, confidential or semi-confidential, but in any case the standards are accessible to a target population of workers (engineers, scientists, technicians, etc.) with need to measure or adhere to such technical standard.

For example, some technical standards are listed in Table 1.

TABLE 1

SMPTE 259M
SMPTE 344M
SMPTE 292M
SMPTE 372M
SMPTE 424M
IEEE 802.3ae

TABLE 1-continued

IEEE 802.3an
IEEE 802.3av
IEEE 802.3ba
Telcordia GR-253-CORE
ANSI T1.105
ITU-Telecommunication Standardization Sector (ITU-T) G.707
OIF-CEI-02.0
SATA Revision 1.x
SATA Revision 2.x
SATA Revision 3.x
CPRI V4.0
Fibre Channel FC-PI-4
Fibre Channel FC-PI
Infiniband Architecture Specification Volume 1
Infiniband Architecture Specification Volume 2
Serial Attached Small Computer System Interface
Serial RapidIO (SRIO) Rev. 1.3
SRIO Rev. 2.0
SFF INF-8077i
SFF-8431.

Certain technical standards associated with serial-data transmission applications may contain one or more standard specifications including a specification for jitter in a specified serial-data signal. The specification for jitter in the specified serial-data signal may designate a maximum permissible amount of jitter.

Some types of jitter include: time-interval error (TIE) jitter, period jitter, cycle-to-cycle jitter, half-period jitter, and N-cycle jitter. TIE jitter may be defined as the short-term variation of the significant instants of a digital signal from their ideal positions in time; period jitter may be defined as the variation of a period in a signal from its mean period; cycle-to-cycle jitter may be defined as the variation in period between two adjacent cycles in a signal; half-period jitter may be defined as the variation of any half-period in a signal from its mean half-period; and N-cycle jitter may be defined as the variation between two edges in a signal that are N-cycles apart. Other types of jitter also exist. Note that since no universal standard exists for jitter terminology, the above terminology and/or definitions for types of jitter may differ from that found in the literature and/or technical standard, for example, depending on the source of the literature and/or technical standard.

Additionally, each type of jitter may be decomposed into one or more statistical components of jitter. Example statistical components of jitter include:

a random component of jitter, also referred to as random jitter (RJ);
a deterministic component of jitter, also referred to as deterministic jitter (DJ);
a periodic component of jitter, also referred to as periodic jitter (PJ);
a data-dependent component of jitter, also referred to as data-dependent jitter (DDJ) or inter-symbol interference (ISI) jitter;

The RJ may be created by random noise and characterized by a Gaussian distribution. The DJ may be created by system mechanisms (such as crosstalk, reflections, loss) and/or bandwidth limitations (such as ISI) and characterized by a distribution that is bounded in time. The DJ may include PJ, and DDJ. The PJ may be described as jitter that repeats in a cyclical fashion, and when associated with a serial-data signal, may be uncorrelated to the serial-data bit pattern. The DDJ may describe the time differences required for a signal to arrive at a receiver threshold when starting from different places in bit sequences. As mentioned above, since jitter terminology is not universally standardized, the above terminology and/or definitions for the statistical components of jitter may differ from that found in the literature and/or technical standard, for example, depending on the source of the literature and/or technical standard. Other statistical components of jitter also exist.

Although it may be desirable to measure each statistical component of jitter separately, this is not generally possible because all statistical components of jitter are mixed together and appear as total jitter. Total jitter (TJ) may therefore be considered as a statistical composition of jitter that includes all statistical components of jitter. Thus, TJ includes both RJ and DJ. Various mathematical algorithms exist to decompose, or separate, TJ into one or more statistical components of jitter in the serial-data signal. While each type of jitter may be decomposed into one or more statistical components of jitter, this decomposition process is generally applied to TIE jitter in serial-data transmission applications.

Certain example mechanisms by which the embodiments herein benefit providing an unbiased analysis of an analog property of a signal are described below with reference to FIGS. 1 through 11.

Referring to FIG. 1, an electronic device 100 (as described above) is shown to have an output 110 that provides a signal 120 (as described above). The signal 120, which is analog in nature, may be optical or electrical, single-ended or differential. The signal may be, for example, a clock timing signal (e.g. sine wave or square wave); a digital data signal; a pulse-amplitude modulated signal; or a modulated sine wave signal representing a digital bit stream. The output 110 may exist in the form of a standard or custom electrical or optical connector (e.g. BNC, SMA, triax, RJ45, Infiiniband, CX4, fiber-optic LC or SC connector), or connect to a physical probe. The output may be from an electronic device such as an integrated circuit (IC); a semiconductor chip; a packaged semiconductor chip; a printed circuit board (PCB); a PCB assembly; an electrical device, component or module; an optical transceiver; an optical transponder; a clock timing source (as discussed above); a test instrument; a serializer or deserializer (e.g. SERDES); a signal (e.g. pulse, pattern, data) source; or an electronic system or sub-system. The signal 120 may be single-ended or differential, optical or electrical, and may be accessed by attaching a physical probe from a test instrument to a contact point located at the output 110.

Figure 2:
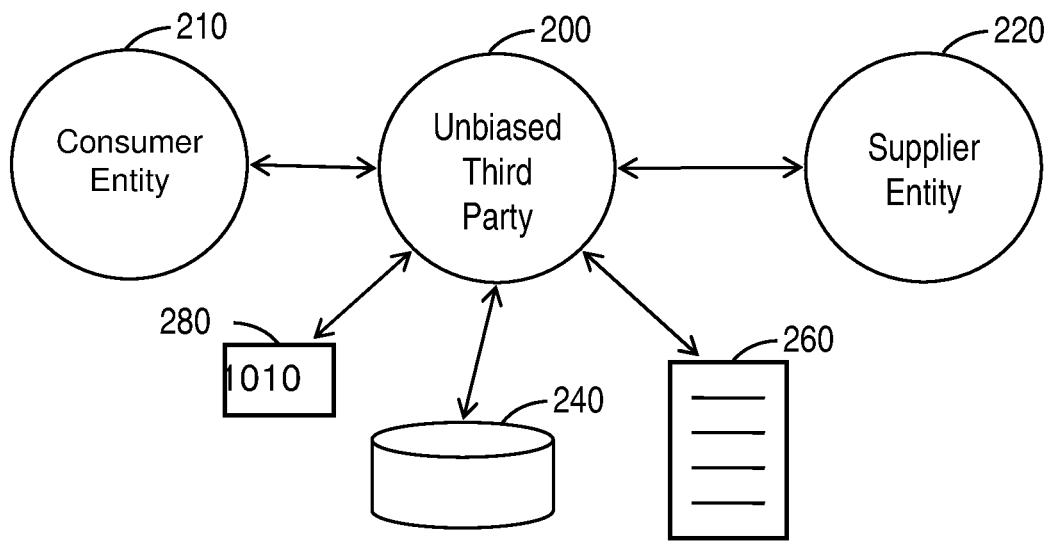
FIG. 2 depicts various example entities in accordance with certain embodiments consistent with the present invention.

Referring to FIG. 2, three key entities are discussed herein: a consumer entity 210, a supplier entity 220, and a third party 200. All three of these entities are defined to be separate from and have independent decision-making authority relative to each other. An entity may describe an individual, a group of individuals, or an organization (e.g. corporation, company). The third party 200 obtains a data set 240. The data set 240 may be maintained, for example, in a secure database as suggested in FIG. 2. The data set 240 is derived from at least one measurement on a signal 120 derived from an output 110 of an electronic device 100, where the data set 240 describes an analog property of the signal 120. The data set 240 may be derived from one or more measurements of the signal 120 using, for example, a real-time sampling oscilloscope (also called a digital storage oscilloscope), an equivalent-time sampling oscilloscope, a spectrum analyzer, or a phase-noise analyzer. The data set 240 may be derived from the electronic device 100, for example, through the use of a sampling circuit (such as used by a real-time sampling oscilloscope) that converts the signal 120 into a plurality of samples obtained at a plurality of sample times, where each sample represents an amplitude of the signal 120 at a corresponding sample time. The data set 240 may alternatively be, for example, a series of jitter values derived from the plurality of samples. Alternatively, the data set 240 may include spectral density data, phase noise data, or other data that describes an analog property of the signal 120.

The third party 200 maintains a permission set 260. The permission set 260 is based on data received from a supplier entity 220. The permission set 260 is used by the third party 200 (and indirectly by the supplier entity 220) to control access to information computed from the data set 240. Only consumer entities having permission as determined by the permission set 260 are permitted access to information computed from the data set 240. Information computed from the data set 240 may include the data set 240. The supplier entity 220 is thereby able to control access by one or more consumer entities to information computed from the data set 240. The permission set 260 may also be maintained in a secure database.

The third party 200 also maintains computer code 280 that computes an analysis result from the data set 240. The computer code 280 may, for example, contain a plurality of analysis subroutines, where each analysis subroutine computes a unique analysis result from the data set 240. Each analysis routine may enable the consumer entity 210 to interact with the data set 240. Example analysis routines include plotting the data set 240, and performing mathematical operations on the data set 240 in order to derive desirable information. Non-limiting example analysis results may include a plot, chart, or graph derived from the data set 240; a new set of data based on the data set 240; statistical measures (e.g. maximum, minimum, standard deviation, variance) computed from the data set 240; one or more digital states (e.g. an analysis of whether a threshold has been exceeded or not expressed as pass or fail, or one of a plurality of discrete states such as 0 or 1, or one of 256 levels).

A detailed description of certain embodiments based on the items described above is described in relation to FIGS. 3 through 6 considered simultaneously as follows. Referring to the example depicted in FIG. 3, a third party 200 has access to a plurality of data sets (identified as DS1, DS2, DS3, DS4, and DS5), and a plurality of permission sets (PS1, PS2, PS3, and PS4). Each data set is associated with a permission set. For example, DS1 is associated with PS1; DS2 with PS2; DS3 and DS5 with PS3; and DS4 with PS4. Each permission set is associated with supplier entity. For example, PS1 is associated with organization 1 (ORG1); PS2 and PS4 with organization 2 (ORG2); and PS3 and PS5 with organization 3 (ORG3). While the permission set is maintained by the third party 200, the permission set is based on data received from the supplier entity. In this way, the supplier entity indirectly controls access by one or more consumer entities to information computed from the data set.

Figure 3:
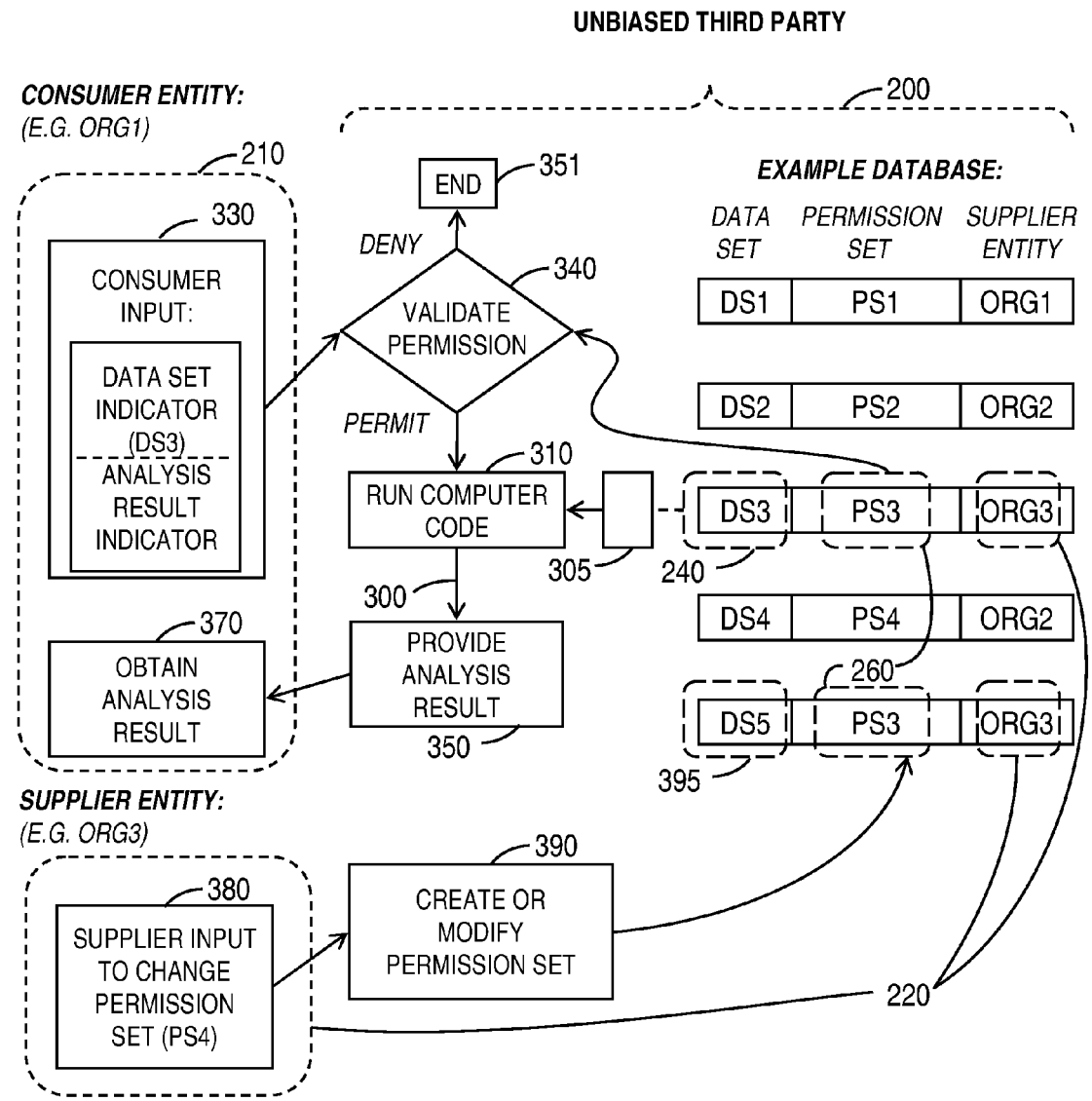
FIG. 3 depicts an example method in accordance with certain embodiments consistent with the present invention.

Continuing the FIG. 3 example in FIG. 4, three supplier entities (ORG1, ORG2, ORG3) influence at least one of four permission sets (260, 461-463) for four consumer entities (selected from 210, 412, 260, 414, and 415; note that FIG. 4 assumes a supplier entity will always allow itself permission to access a data set for which it controls access, and that a supplier entity is not considered a consumer entity with regards to a data set for which it controls access). Note that a supplier entity in a different set of circumstances may become a consumer entity, and vice versa. For example, considering DS1, ORG1 is a supplier entity and ORG2 is a consumer entity. However, considering DS2, ORG2 is a supplier entity and ORG1 is a consumer entity. For a given data set, the supplier entity is the entity that influences the permission set associated with the given data set, and all other entities other than the third party are considered to be consumer entities. For example, permission set 260 (PS3) is based on data received from the supplier entity 220 (ORG3), where permission set 260 (PS3) permits access by one or more consumer entities to information computed from the data set 240 (DS3).

In the example depicted in FIG. 4, consumer entities 210 (ORG1) and 415 (ORG5) are permitted access and consumer entities 412 (ORG2) and 414 (ORG4) are denied access to data set 240 (DS3) by permission set 260 (PS3); supplier entity 220 (ORG3) is assumed to have permission to data set 240 (DS3) as depicted by 420 in FIG. 4. Note that FIG. 4 additionally illustrates that one permission set (e.g. 260 (PS3)) can control access to more than one data set (e.g. DS5, and 240 (DS3)), and that one supplier entity (e.g. ORG2) can be associated with more than one permission set (e.g. 462 (PS2), and 463 (PS4)).

An additional example is depicted in FIG. 3, where the supplier entity 220 (ORG3) provides supplier input 380 to the third party 200. In this example, the third party 200 receives one or more supplier inputs 390 representing a request to either create or modify a permission set 260 (PS4) to either permit or deny one or more consumer entities from accessing information computed from the data set 395 (DS5).

Referring again to FIG. 3 and continuing the above example, the third party 200 maintains the permission set 260, where the permission set 260 is based on data received from the supplier entity 220, and where one or more consumer entities having permission as determined by the permission set 260 are permitted access to information computed from the data set 240. The third party 200 also maintains computer code 280 (as described above) that computes an analysis result 300 (as described above) from the data set 240.

The third party 200 receives at least one consumer input 330 from a consumer entity 210, where the at least one consumer input 330 represents a request to obtain the analysis result 300. For example, the at least one consumer input 330 as depicted in FIG. 3 comprises a data set indicator representing the data set 240 (DS3), and an analysis result indicator.

Although not shown, the at least one consumer input 330 may also include a proof of identity that allows the third party 200 to verify the identity of the consumer entity 210. Proof of identity may comprise, for example, a username and password, and/or requiring a response to an email sent to the supplier entity's email address.

Referring again to FIGS. 1 through 3 in the above example, the third party 200 obtains 305 the data set 240, where the data set 240 is derived from at least one measurement on a signal 120 derived from an output 110 of an electronic device 100, and where the data set 240 describes an analog property of the signal 120. The third party 200 executes 310 the computer code 280 on at least one computer processor to compute the analysis result 300 from the data set 240 after receiving the at least one consumer input 330. The third party 200 determines 340 from the permission set 260 whether the consumer entity 210 is permitted access to information computed from the data set 240. Information computed from the data set 240 may include the data set 240, and/or may include any other information derived from the data set 240, including the analysis result 300. If the consumer entity 240 is permitted access to the information computed from the data set 240, then the third party 200 provides 350 the analysis result 300 computed from the data set 240 to the consumer entity 210. The consumer entity 210 may obtain 370 the analysis result 300. Otherwise, if the consumer entity 210 is denied access 351 to the information computed from the data set 240, then the third party 200 does not provide the analysis result 300 to the consumer entity 210. In the example described by FIGS. 3 and 4, the permission set 260 (PS3) permits 421 the consumer entity 210 (ORG1) access to the analysis result 300 computed from the data set 240 (DS3).

Figure 5:
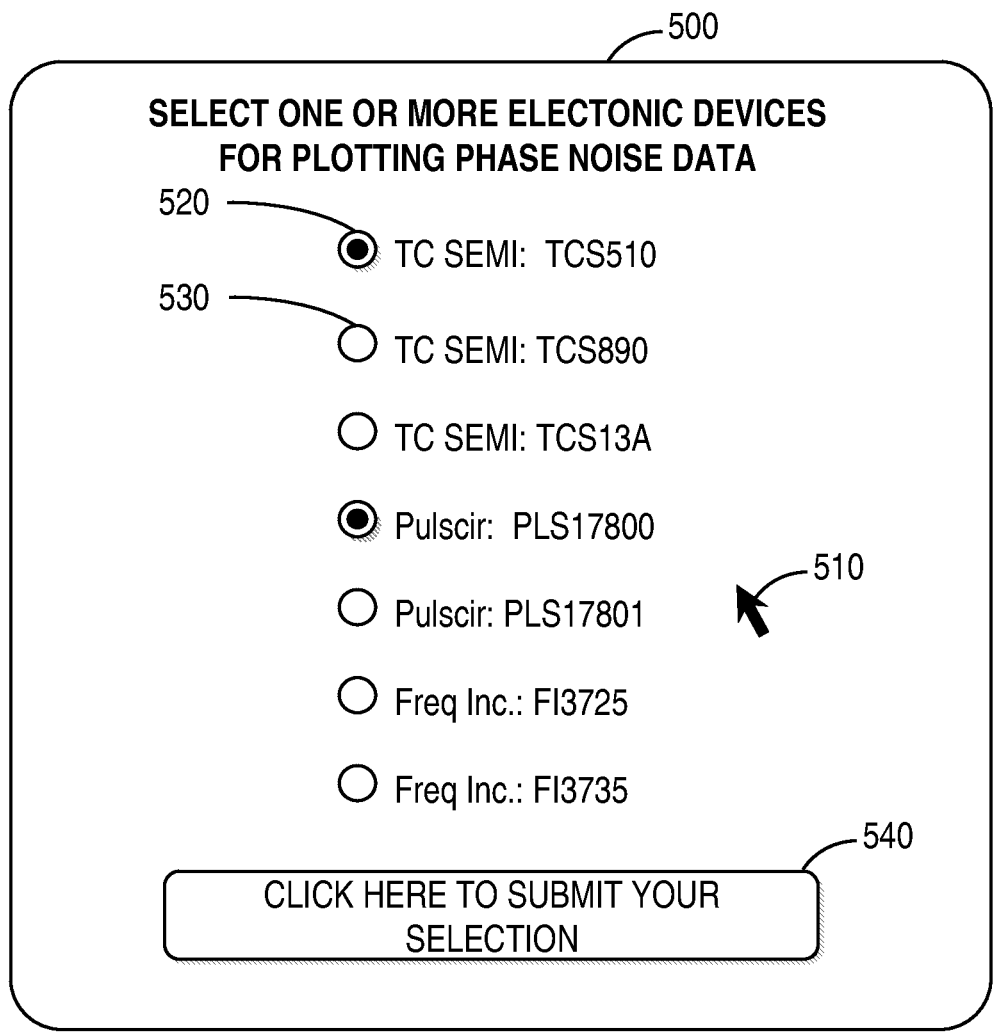
FIG. 5 depicts an example graphical user interface in accordance with certain embodiments consistent with the present invention.

There are many ways in which the at least one consumer input may be provided by the consumer entity 210 to the third party 200. One such way is illustrated in FIG. 5 using an example graphical user interface 500 (GUI) that may be provided by the third party 200 to the consumer entity 210. Here, the GUI 500 facilitates the consumer entity 210 in making a selection of one or more parameters representing a request to obtain the analysis result 300. In the example depicted in FIG. 5, one or more electronic devices may be selected by the consumer entity 210 to request a phase noise plot containing phase noise curves associated with the selected electronic devices. The GUI 500 may run, for example, on a computer operated by the consumer entity 210, or on a server accessed by the consumer entity 210 over a computer network. The GUI 500 is manipulated by the consumer entity 210, for example, using a computer mouse. The consumer entity 210 may position a computer mouse icon or cursor or highlight or pointer 510 over a displayed radio button and click a button on a computer mouse or keyboard or other input device to either select or de-select a radio button corresponding to an electronic device 100 to signify the selection 520 or de-selection 530, respectively, of an electronic device, for one or more electronic devices. The example shown in FIG. 5 illustrates the selection of the following two electrical devices: product number TCS510 manufactured by TC Semi, and product number PLS17800 manufactured by Pulseir. These two selections selected by the consumer entity 210 represent two corresponding data sets to the third party 200.

A submission button 540 may be selected by the consumer entity 210 operating the computer mouse to submit the selection of one or more electrical devices for processing. Submitting 540 these selections from the GUI 500 represents a request to obtain an analysis result comprising a phase noise plot containing a phase noise curve associated with TCS510 and another phase noise curve associated with PLS17800. By plotting two phase noise curves in one graph, for example, the consumer entity 210 can better compare the phase noise performance of these two electronic devices across a range of offset frequencies.

Figure 6:
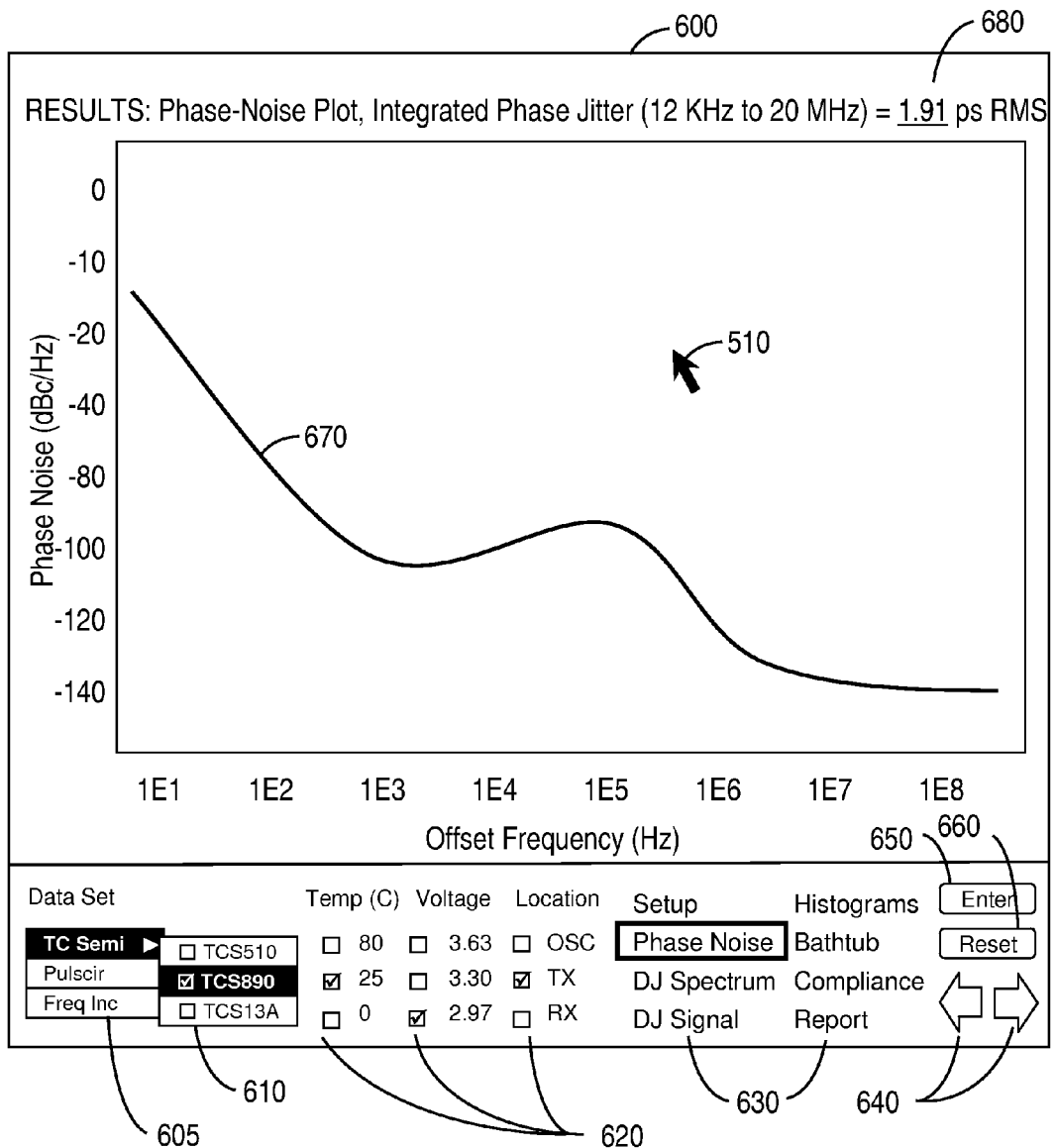
FIG. 6 depicts an alternate example graphical user interface in accordance with certain embodiments consistent with the present invention.

There are many ways that the third party 200 may provide an analysis result 300 to the consumer entity 210. One way is illustrated in FIG. 6 using another GUI. The GUI 600 provided by the third party 200 and depicted in FIG. 6 can be used by the consumer entity 210 to both select and obtain the analysis result 300. The GUI 600 provides a variety of parameters that may be selected by the consumer entity 210 to represent one or more data sets to the third party 200. For example, the following parameters may be selected from the GUI 600: an electronic device 100 manufacturer 605, an electronic device 100 product number 610, one of several test conditions 620 (e.g. temperature, voltage) related to the measurement environment, and a location that identifies a particular type of software filter (e.g. OSC, TX, RX) that may be applied for analysis. The type of analysis result may also be selected from the GUI 600 by the consumer entity 210. For example, but without limitation, the GUI 600 presents several types of analysis results 630 including a phase noise plot, a deterministic jitter (DJ) spectrum plot, a DJ time-series plot, a histogram plot, a bathtub curve plot, a compliance test result, and a report of key statistics related to the selected data sets. The type of analysis result selected in FIG. 6 is the phase noise plot, which appears in the main panel as 670.

After selecting the various parameters of interest, the consumer entity 210 may select an "Enter" button 650 to submit the selected parameters for processing by the third party 200. The third party 200 then receives the at least one consumer input 330 from the consumer entity 210, where the at least one consumer input 330 represents a request to obtain the analysis result 300. The example depicted in FIG. 6 illustrates a consumer entity's selection for requesting an analysis result 300 that is a phase noise plot 670 of a data set 240 derived from an electronic device 100 having a product number of TCS890 and manufactured by TC Semi. A data set 240 is obtained by the third party 200, where the data set 240 comprises phase noise data derived from a signal 120 derived from an output 110 of the electronic device TCS890, where TCS890 was measured in a temperature environment of 25 C and with an applied voltage of 2.97V. Additionally, FIG. 6 identifies a transmitter jitter filter (Location: TX) is applied to the data set and the resulting phase noise plot 670 is provided by the third party 200 to the consumer entity 210 via the GUI 600.

A "Reset" button 660 is depicted in FIG. 6 for the consumer entity 210 to clear the selected parameters in the GUI 600. Additional controls may be available in the GUI 600 to access one or more analysis results. For example, arrows buttons 640 are depicted in the GUI 600 that enable the consumer entity 210 to cycle the main GUI 600 panel between the various analysis results available for the selected data set (e.g. Phase Noise, DJ Spectrum, DJ Signal, Histograms, Bathtub, Compliance, Report, etc.). Finally, additional information derived from the data set 240 and relevant to the requested analysis result may also be provided by the third party 200. For example, FIG. 6 shows that integrating the phase noise plot 670 over an offset frequency range of 12 KHz to 20 MHz results in 1.91 ps RMS of jitter 680.

It is again noted that the consumer entity 210, the supplier entity 220, and the third party 200 are all defined herein to be separate from and have independent decision-making authority relative to each other. The overriding intent, however, of a third party 200 is to provide a consumer entity 210 with an unbiased analysis of an analog property of a signal 120. The third party 200 should therefore not purposely corrupt the analysis result 300 provided to the consumer entity 210, so that the anaylsis result can be considered uncorrupted and reliable. The consumer entity 210 and the supplier entity 220 should trust that the third party does not have a prejudice in favor of or against either the consumer entity 210 or the supplier entity 220 in a way that is considered to be unfair. One way to establish this relationship is that the third party 200, the consumer entity 210, and the supplier entity 220 are all independent entities (aside from considerations related to shareholders and board of directors) such that neither the consumer entity 210 nor the supplier entity 220 are able to skew (that is, make biased or distorted in a way that is regarded as inaccurate, unfair, or misleading) the analysis result 300 between the time of obtaining the data set 240 and providing the analysis result 300 to the consumer entity 210. The third party 200 may implement safeguards to prevent potential corruption of data and/or procedures, such as restricting access to the computer code 280, the data set 240, 395, and the analysis result 300 to ensure that the consumer entity 210 and the supplier entity 220 are unable to skew the analysis result 300 and obtain an unfair advantage. The third party 200 may comprise multiple entities (although the third party 200 may not comprise the supplier entity 220 nor the consumer entity 210) that carry out the work described herein for the third party 200 (for example, if the third party 200 employed sub-contractors, or if the third party 200 included the work of subsidiaries owned in part or in whole by the third party 200).

A flow chart depicting an example of certain illustrative embodiments consistent with the present invention is provided in FIG. 7, and discussed in relation to FIGS. 1 through 6 as follows. A third party 200 obtains 700 a data set 240, where the data set 240 is derived from at least one measurement on a signal 120 derived from an output 110 of an electronic device 100, and where the data set 240 describes an analog property of the signal 120. The third party 200 maintains 705 computer code 280 that computes an analysis result 300 from the data set 240. The third party maintains 735 a permission set 260.

The third party 200 connects 710 a server to a first client computer over a computer network 720, where the first client computer is operated by a supplier entity 220. The supplier entity 220 connects 715 the first client computer to the server. The third party 200 supplies 725 a supplier user interface over the computer network 720 to the supplier entity 220. The supplier entity 220 receives 730 the supplier user interface. The supplier user interface may include, for example, one or more web pages provided by the server to the first client computer and interpreted using a web browser on the first client computer. Alternatively, the supplier user interface may run on the server and be accessed by the first client computer through a remote connection to the server, as facilitated by technologies such as NX (for X window systems) or virtual network computing (VNC).

The supplier user interface may be, for example, a GUI that allows the supplier entity 220 to select one or more consumer entities, and for each selected consumer entity, provide input as to whether or not the consumer entity 210 is allowed or denied access to information computed from the data set 240. The supplier user interface may thus be used by the supplier entity 220 to send 740 one or more supplier inputs to the third party 200. The supplier user interface receives 745 in response to input from the supplier entity 220 one or more supplier inputs representing a request to either create or modify the permission set 260 to either permit or deny one or more consumer entities from accessing information computed from the data set 240. The third party 200 performs 747 the request to either create or modify the permission set 260. As part of this process, the third party 200 may request and/or receive proof of identity (as described above) from the supplier entity 220 to validate the identity of the supplier entity 220 before performing 747 the request to either create or modify the permission set.

The third party 200 connects 750 the server to a second client computer over the computer network 720, where the second client computer is operated by a consumer entity 210. The second client computer connects 755 to the server over the computer network 720. The third party 200 supplies 760 a consumer user interface over the computer network 720 to the consumer entity 210. The consumer entity 210 receives 765 the consumer user interface over the computer network 720. The consumer user interface may include, for example, one or more web pages provided by the server to the second client computer and interpreted using a web browser on the second client computer. Alternatively, the consumer user interface may run on the server and be accessed by the second client computer through a remote connection to the server, as facilitated by technologies such as NX (for X window systems) or virtual network computing (VNC). The consumer user interface may be a GUI, for example, such as discussed in relation to FIG. 6. One or more consumer inputs may be selected by the consumer entity 210 and sent 770 to the third party 200 through the consumer user interface. The consumer user interface receives 775 in response to input from the consumer entity 210 at least one consumer input representing a request to obtain the analysis result 240. Additional input may be received from the consumer entity 210, such as proof of identity (as described above) to validate the consumer entity's identity.

The third party 200 determines 780 from the permission set 260 that the consumer entity 210 is permitted access to information computed from the data set 240. The information computed from the data set 240 may include the data set 240, and/or may include any other information derived from the data set 240, including the analysis result 300. The third party 200 executes 785 the computer code 280 on at least one computer processor to compute the analysis result 300 from the data set 240 after receiving the at least one consumer input. Although not necessary, it may be more efficient to execute 785 the computer code 280 after determining 780 that the consumer entity 210 is permitted access to information computed from the data set 240, as depicted in FIG. 7. The computer code 280 may be executed 785 on the at least one computer processor at the second client computer or at the server. The consumer user interface provides 790 the analysis result 300 computed from the data set 240 to the consumer entity 210. The consumer user interface may, for example, be a GUI as described in relation to FIG. 6, where the GUI enables the consumer entity 210 to both send 770 one or more consumer inputs to the third party 200 and receive 795 one or more analysis results from the unbiased consumer entity 300.

Figure 7:
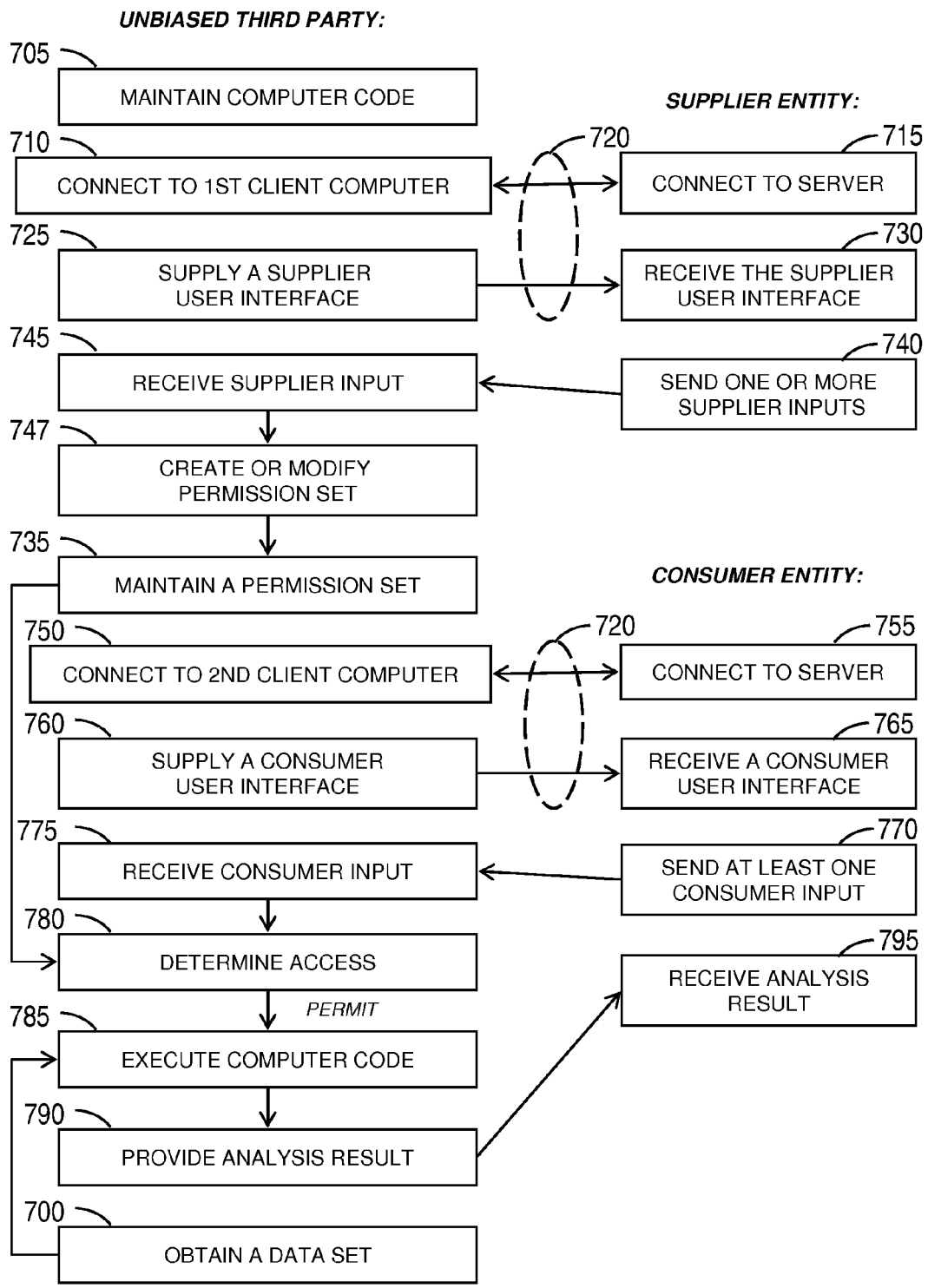
FIG. 7 is an example flow chart of a method based on a server in accordance with certain embodiments consistent with the present invention.
Figure 11:
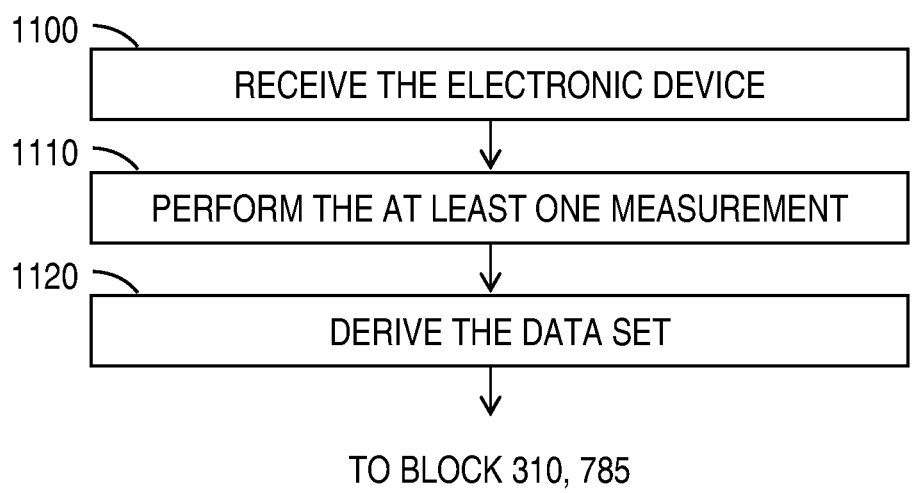
FIG. 11 is an example flow chart of a method based on a receiving the electronic device in accordance with certain embodiments consistent with the present invention.

The flow chart depicted in FIG. 11 further develops one or more of the above discussed embodiments related to FIGS. 3 and 7. At least one embodiment is based on replacing block 305 in FIG. 3 or block 700 in FIG. 7 with FIG. 11. Referring to FIG. 11, the electronic device 100 is received 1100 by the third party 200. The third party 200 performs 1110 the at least one measurement on the signal 120 derived from the output 110 of the electronic device 100. The third party 200 derives 1120 the data set 240 from the at least one measurement. In this way, the third party 200 obtains the data set 240. The at least one measurement may be performed using one or more test instruments, such as an oscilloscope, a spectrum analyzer, or a phase noise analyzer. The at least one measurement may measure any analog property of the signal 120, such as jitter, phase noise, or spectral density. The third party 200 may receive the electronic device 100, for example, from the supplier entity 220.

Figure 8:
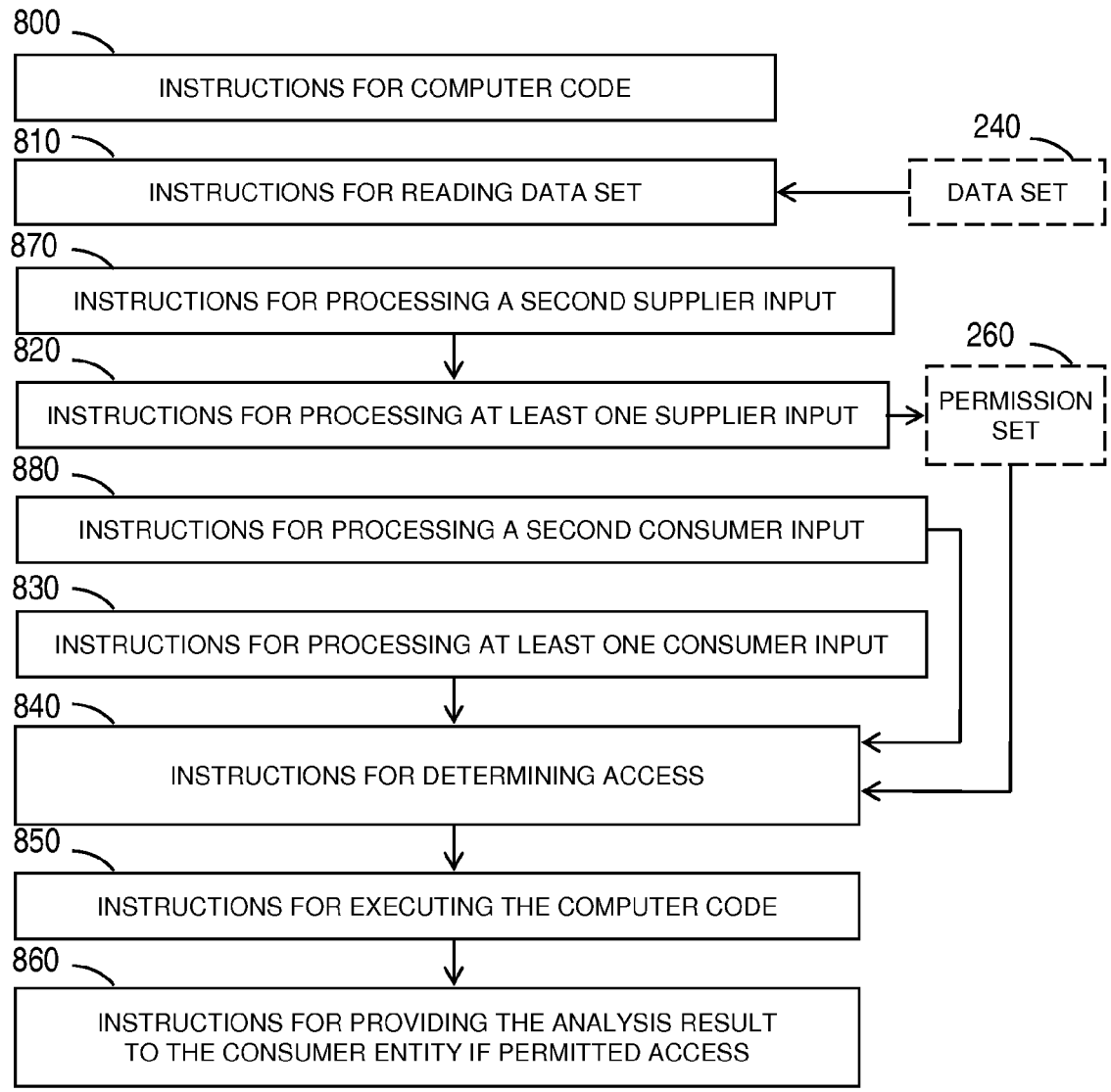
FIG. 8 is an example flow chart depicting a process in accordance with certain embodiments consistent with the present invention.

FIG. 8 depicts an example of certain embodiments for one or more computer readable storage devices such as tangible non-transitory computer-readable storage devices containing programming instructions that when executed on one or more programmed processors carry out a process consistent with implementations of the present invention for analyzing an analog property of a signal. A set of programming instructions includes instructions 800 for computer code 280 compatible to act upon a data set 240 provided by a third party 200 that computes an analysis result 300 from the data set 240, the data set 240 derived from at least one measurement on a signal 120 derived from an output 110 of an electronic device 100, where the data set 240 describes an analog property of the signal 120. Further instructions 810 read the data set 240. Additional instructions 820 process at least one supplier input from a supplier entity 220 to either create or modify a permission set 260 to either permit or deny one or more consumer entities from accessing information computed from the data set 240. Information computed from the data set 240 may include the data set 240. The at least one supplier input may include, for example, one or more selections submitted by the supplier entity 220 using a user interface provided by the third party 200.

Further instructions 830 process at least one consumer input from a consumer entity 210 to receive a request to provide the analysis result 240. The at least one consumer input may include, for example, one or more parameters selected by the consumer entity 210 using a user interface provided by the third party 200, such as one of the GUIs described above in relation to FIGS. 5 and 6. Additional instructions 840 determine whether the consumer entity 210 is permitted access to information computed from the data set 240 based on the permission set 260. Further instructions 850 execute the computer code 280 to compute the analysis result 300 from the data set 240 after processing 820 the at least one consumer input. Additional instructions 860 provide, by the third party 200, the analysis result 300 to the consumer entity 210 if the consumer entity 210 is determined to have access to information computed from the data set 240.

At least one embodiment includes the example embodiment for one or more computer-readable storage devices discussed above in relation to FIG. 8, and the instructions further comprise instructions 870 for processing a second supplier input to verify the identity of the supplier entity 229, and instructions 880 for processing a second consumer input to verify the identity of the consumer entity 210. An identity may be verified, for example, by receiving a username and password, and/or requiring a response to an email sent to the supplier entity 220 and/or consumer entity 210 email address. Digital certificates may also be used as part of a more stringent verification process.

Figure 9:
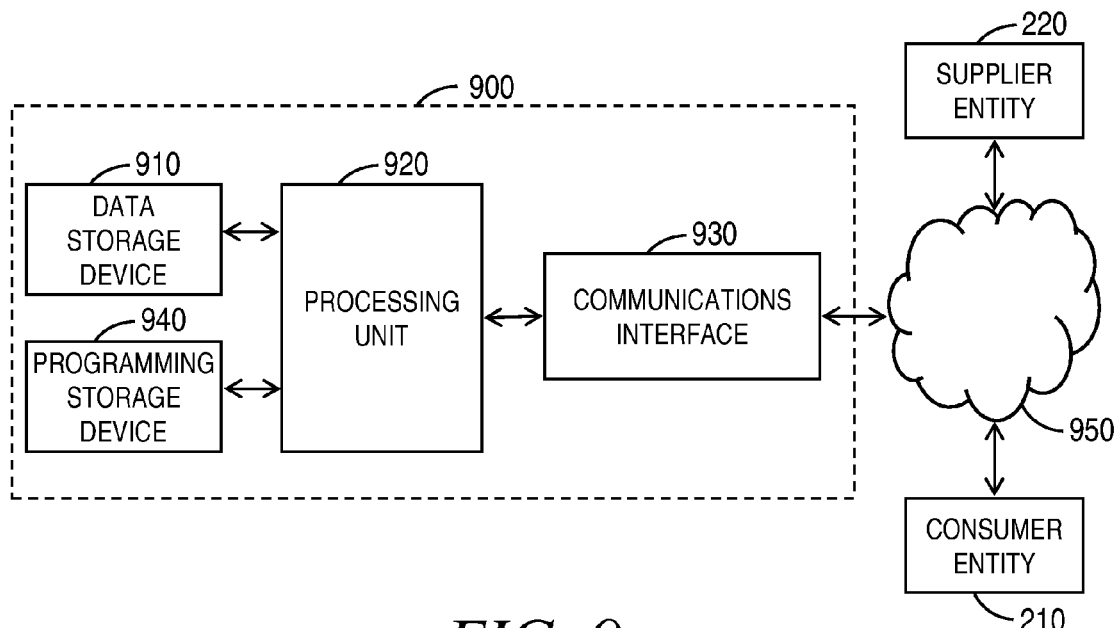
FIG. 9 is an example apparatus in accordance with certain embodiments consistent with the present invention.

An example apparatus 900 for implementing certain embodiments is shown in FIG. 9. At least one data storage device 910 connects to at least one processing unit 920, where the at least one data storage device 910 has sufficient capacity to retain at least an analysis result 300, a permission set 260, and a data set 240; the data set 240 derived from at least one measurement on a signal 120 derived from an output 110 of an electronic device 100, where the data set 240 describes an analog property of the signal 120. A communications interface 930 communicates with at least one of a supplier entity 220 and a consumer entity 210, and connects to the at least one processing unit 920. FIG. 9 illustrates the communications interface communicating with at least one of the supplier entity 220 and the consumer entity 210 over a computer network 950, such as the Internet. For example, the apparatus 900 may be a server, where the communications interface 930 may be a network interface card communicating with one or more client computers over a computer network, where the one or more client computers are operated by at least one of the supplier entity 220 and the consumer entity 210. Alternatively, the apparatus 900 may be a computer with a communications interface 930 that communicates with at least one of the supplier entity 220 and the consumer entity 210.

Figure 10:
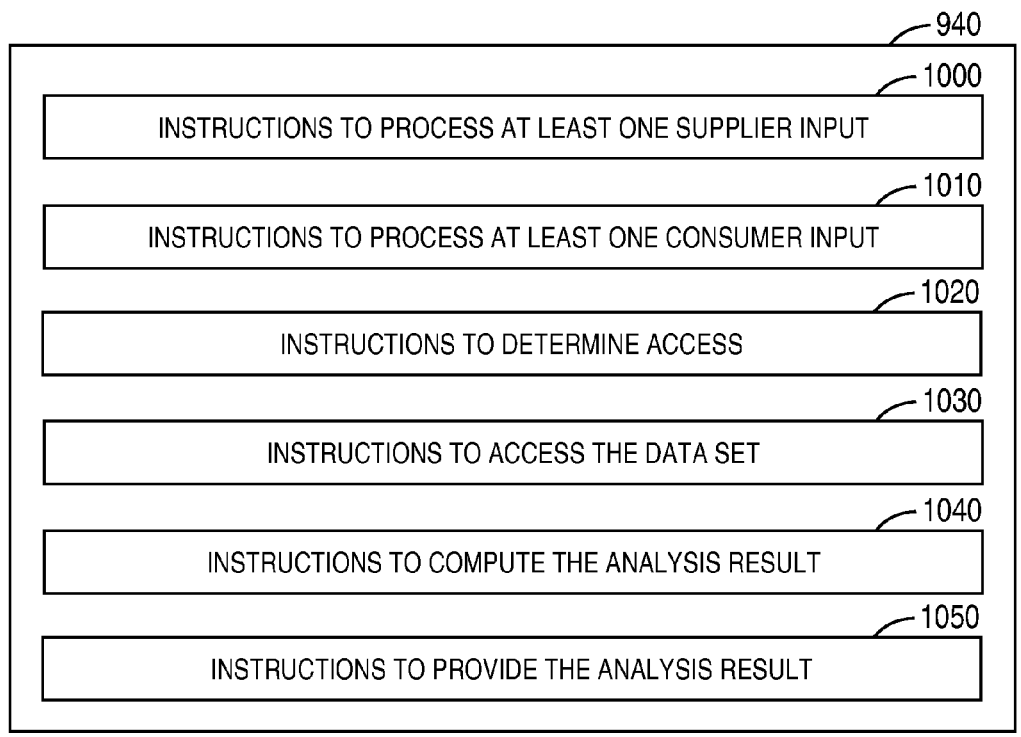
FIG. 10 depicts an example of the contents of a programming storage device in accordance with certain embodiments consistent with the present invention.

At least one programming storage device 940 connects to the at least one processing unit 920, and contains computer programming instructions as depicted in FIG. 10 and discussed as follows. Instructions 1000 process at least one supplier input from the supplier entity 220 received over the communications interface 930 to either create or modify the permission set 260, where the permission set 260 controls access by one or more consumer entities to information computed from the data set 240. Further instructions 1010 process at least one consumer input from the consumer entity 210 received over the communications interface 930 to identify a request to provide the analysis result 240. Further instructions 1020 determine whether the consumer entity 210 is permitted access to information computed from the data set 240 based on the permission set 260. Further instructions 1030 access the data set 240. Further instructions 1040 compute the analysis result 300 from the data set 240 after processing the at least one consumer input. Further instructions 1050 provide the analysis result 240 to the consumer entity 210 over the communications interface 930 if the consumer entity 210 is permitted access to information computed from the data set 240.

Finally, the apparatus 900 includes the least one processing unit 920 operated by a third party 200 and connected to the communications interface 930, the at least one data storage device 910, and the at least one programming storage device 940, that executes the computer programming instructions (contained in the at least one programming storage device 940).

In certain embodiments, the analysis result 300 is derived from a first quantity and a second quantity, where the first quantity is computed from the data set 240, and where the analysis result 300 includes at least one of the following: (1) a magnitude comparison indicator indicating a relative magnitude of at least one of: the first quantity to the second quantity; and the second quantity to the first quantity; (2) a margin comparison indicator indicating a relative margin between at least one of: the first quantity and the second quantity; and the second quantity and the first quantity; (3) a pass/fail indicator indicating whether the first quantity is either larger or smaller than the second quantity; (4) a result based on a computation of a mathematical expression comprising the first quantity and the second quantity; and (5) a representation derived from the first quantity and the second quantity. Certain applications may benefit by comparing the first quantity and the second quantity. For example, the second quantity may represent a threshold for judging quality or performance used by manufacturing during production testing to determine a pass or fail status before committing a product for shipment. Comparing the first quantity and the second quantity can be useful to determine a status of pass or fail, or a measure of the amount consumed or margin remaining for the first quantity with respect to the second quantity (or vice versa). In one or more embodiments, the first quantity is a first value of jitter, and the second quantity is a second value of jitter. In certain embodiments, the second value of jitter is derived from a specification for jitter documented in a technical standard (as described above). In other embodiments, the second value of jitter is derived from the consumer entity 210.

In certain illustrative embodiments, the at least one consumer input comprises a first selection representing at least one of the data set 240 and the electronic device 100, and a second selection representing at least one of: a technical standard (as discussed above); a specification documented in a technical standard (as discussed above); and a limit derived from an organization. In one or more embodiments, the analysis result 300 is derived from a first quantity and a second quantity. The first quantity is a first value of jitter computed from the data set 240. The second quantity is a second value of jitter derived from at least one of the technical standard, the specification, and the limit. The analysis result 300 comprises at least one of the following: (1) a magnitude comparison indicator indicating a relative magnitude of at least one of: the first quantity to the second quantity; and the second quantity to the first quantity; (2) a margin comparison indicator indicating a relative margin between at least one of: the first quantity and the second quantity; and the second quantity and the first quantity; (3) a pass/fail indicator indicating whether the first quantity is either larger or smaller than the second quantity; (4) a result based on a computation of a mathematical expression comprising the first quantity and the second quantity; and (5) a representation derived from the first quantity and the second quantity.

In one or more illustrative embodiments, the at least one consumer input includes at least one of the following: (1) an electronic device identifier representing the electronic device 100; (2) a data set indicator representing the data set 240; (3) a temperature indicator representing a temperature condition present at least some of the time during the at least one measurement; (4) a voltage indicator representing a voltage condition applied at least some of the time during the at least one measurement; (5) a frequency indicator representing a frequency of oscillation for the signal 120; and (6) an analysis result indicator representing a type of analysis result. In at least one embodiment, the type of analysis result includes at least one of the following: (a) a bathtub plot; (b) a Q-scale plot; (c) a frequency spectrum of a time-domain signal; (d) a time trend of data; (e) a histogram; (f) a measure of jitter; and (g) a measure of phase noise.

In at least one illustrative embodiment, the data set 240 comprises at least one of: jitter data, spectral density data, and phase noise data. The jitter data may include any type of jitter (e.g. period jitter, cycle to cycle jitter, N-cycle jitter, time-interval error, phase jitter) data, and/or any composition of jitter (e.g. random jitter, deterministic jitter, duty-cycle dependent jitter, data dependent jitter) data. The spectral density data may include, for example, power spectral density data or energy spectral density data. The phase noise data may be expressed in units of dBc/Hertz. The data set 240 may be derived from measurements obtained using one or more test instruments, such as a phase noise analyzer, a spectrum analyzer, or an oscilloscope.

In certain illustrative embodiments, the analysis result 300 comprises a measure of jitter. The measure of jitter may include an indication or means of assessing the degree, extent, or quality of jitter derived from the signal 120. The jitter may be of any type and/or any composition.

In one or more illustrative embodiments, the signal 120 is a clock timing signal (as described above). The clock timing signal may be derived from the clock timing source as described above.

Those of skilled in the art will recognize upon consideration of the present teachings that one or more of the example embodiments can be accomplished using any form of storage or computer-readable medium, including but not limited to distribution media, intermediate storage media, execution memory of a computer, computer-readable storage device, and any other medium or device or non-transitory storage capable of storing for later reading by a computer program implementing one or more embodiments. Those of ordinary skill in the art will appreciate that the methods described above can be implemented in any number of variations, including adding or deleting certain actions, without departing from the scope of one or more of the embodiments.

Thus, in accord with certain embodiments, an apparatus consistent with certain implementations has at least one data storage device with sufficient capacity to retain at least an analysis result, a permission set, and a data set, the data set derived from at least one measurement on a signal derived from an output of an electronic device, where the data set describes an analog property of the signal; a communications interface in communication with at least one of a supplier entity and a consumer entity; and at least one programming storage device containing computer programming instructions. The computer programming instructions include (1) instructions to process at least one supplier input from the supplier entity received over the communications interface to either create or modify the permission set, where the permission set controls access by one or more consumer entities to information computed from the data set; (2) instructions to process at least one consumer input from the consumer entity received over the communications interface to identify a request to provide the analysis result, the at least one consumer input comprising: (a) a first selection representing at least one of the data set and the electronic device; and (b) a second selection representing at least one of: a technical standard; a specification documented in a technical standard; and a limit derived from an organization; (3) instructions to determine whether the consumer entity is permitted access to information computed from the data set based on the permission set; (4) instructions to access the data set; (5) instructions to compute the analysis result from the data set after processing the at least one consumer input, where the analysis result is derived from a first quantity and a second quantity, where the first quantity is a first value of jitter computed from the data set, where the second quantity is a second value of jitter derived from at least one of the technical standard, the specification, and the limit, and where the analysis result comprises at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity; and (6) instructions to provide the analysis result to the consumer entity over the communications interface if the consumer entity is permitted access to information computed from the data set. At least one processing unit operated by a third party and connected to the communications interface, the at least one data storage device, and the at least one programming storage device, executes the computer programming instructions.

In accord with certain embodiments, another apparatus consistent with certain implementations comprises at least one data storage device with sufficient capacity to retain at least an analysis result, a permission set, and a data set, the data set derived from at least one measurement on a signal derived from an output of an electronic device, where the data set describes an analog property of the signal; a communications interface in communication with at least one of a supplier entity and a consumer entity; and at least one programming storage device containing computer programming instructions. The computer programming instructions include (1) instructions to process at least one supplier input from the supplier entity received over the communications interface to either create or modify the permission set, where the permission set controls access by one or more consumer entities to information computed from the data set; (2) instructions to process at least one consumer input from the consumer entity received over the communications interface to identify a request to provide the analysis result; (3) instructions to determine whether the consumer entity is permitted access to information computed from the data set based on the permission set; (4) instructions to access the data set; (5) instructions to compute the analysis result from the data set after processing the at least one consumer input; and (6) instructions to provide the analysis result to the consumer entity over the communications interface if the consumer entity is permitted access to information computed from the data set. At least one processing unit operated by a third party and connected to the communications interface, the at least one data storage device, and the at least one programming storage device, executes the computer programming instructions.

In certain implementations, the at least one consumer input includes at least one of the following: (i) an electronic device identifier representing the electronic device; (ii) a data set indicator representing the data set; (iii) a temperature indicator representing a temperature condition present at least some of the time during the at least one measurement; (iv) a voltage indicator representing a voltage condition applied at least some of the time during the at least one measurement; (v) a frequency indicator representing a frequency of oscillation for the signal; and (vi) an analysis result indicator representing a type of analysis result.

In certain implementations, the type of analysis result includes at least one of the following: a bathtub plot; a Q-scale plot; a frequency spectrum of a time-domain signal; a time trend of data; a histogram; a measure of jitter; and a measure of phase noise.

In certain implementations the data set comprises at least one of: jitter data, spectral density data, and phase noise data.

In certain implementations, the analysis result comprises a measure of jitter.

In certain implementations the signal comprises a clock timing signal.

In certain implementations, the analysis result is derived from a first quantity and a second quantity; where the first quantity is computed from the data set; and where the analysis result includes at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity.

In certain implementations, the first quantity is a first value of jitter, and the second quantity is a second value of jitter.

In certain implementations, the second value of jitter is derived from a specification for jitter documented in a technical standard.

In certain implementations, the second value of jitter is derived from the consumer entity.

In accord with certain embodiments, a method consistent with certain implementations comprises (1) obtaining, by a third party, a data set, the data set derived from at least one measurement on a signal derived from an output of an electronic device, where the data set describes an analog property of the signal; (2) maintaining, by the third party, a permission set based on data received from a supplier entity, where one or more consumer entities having permission as determined by the permission set are permitted access to information computed from the data set; (3) maintaining, by the third party, computer code that computes an analysis result from the data set; (4) receiving, by the third party, at least one consumer input from a consumer entity, where the at least one consumer input represents a request to obtain the analysis result; (5) determining, by the third party, from the permission set that the consumer entity is permitted access to information computed from the data set; (6) executing the computer code on at least one computer processor to compute the analysis result from the data set after receiving the at least one consumer input; and (7) providing, by the third party, the analysis result computed from the data set to the consumer entity.

In certain implementations, the at least one consumer input includes at least one of the following: an electronic device identifier representing the electronic device; a data set indicator representing the data set; a temperature indicator representing a temperature condition present at least some of the time during the at least one measurement; a voltage indicator representing a voltage condition applied at least some of the time during the at least one measurement; a frequency indicator representing a frequency of oscillation for the signal; and an analysis result indicator representing a type of analysis result.

In certain implementations, the type of analysis result includes at least one of the following: a bathtub plot; a Q-scale plot; a frequency spectrum of a time-domain signal; a time trend of data; a histogram; a measure of jitter; and a measure of phase noise.

In certain implementations, the data set comprises at least one of: jitter data, spectral density data, and phase noise data.

In certain implementations, the analysis result comprises a measure of jitter.

In certain implementations, the signal comprises a clock timing signal.

In certain implementations, the analysis result is derived from a first quantity and a second quantity; where the first quantity is computed from the data set; and where the analysis result includes at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity.

In certain implementations, the first quantity is a first value of jitter, and the second quantity is a second value of jitter.

In certain implementations, the second value of jitter is derived from a specification for jitter documented in a technical standard.

In certain implementations, the second value of jitter is derived from the consumer entity.

In certain implementations, the at least one consumer input comprises a first selection representing at least one of the data set and the electronic device; and a second selection representing at least one of: a technical standard, a specification documented in a technical standard, and a limit derived from an organization.

In certain implementations, the analysis result is derived from a first quantity and a second quantity, where the first quantity is computed from the data set; where the second quantity is derived from at least one of the technical standard, the specification, and the limit; the analysis result comprising at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity.

In certain implementations, the first quantity is a first value of jitter and the second quantity is a second value of jitter.

In certain implementations, the second value of jitter is derived from a specification for jitter documented in a technical standard.

In certain implementations, the second value of jitter is derived from the consumer entity.

In accord with certain embodiments, another method consistent with certain implementations comprises (1) receiving, by a third party, an electronic device; (2) performing, by the third party, at least one measurement on a signal derived from an output of the electronic device; and (3) deriving, by the third party, a data set from the at least one measurement, (4) obtaining, by the third party, the data set, the data set derived from at least one measurement on the signal derived from the output of the electronic device, where the data set describes an analog property of the signal; (5) maintaining, by the third party, a permission set based on data received from a supplier entity, where one or more consumer entities having permission as determined by the permission set are permitted access to information computed from the data set; (6) maintaining, by the third party, computer code that computes an analysis result from the data set; (7) receiving, by the third party, at least one consumer input from a consumer entity, where the at least one consumer input represents a request to obtain the analysis result; (8) determining, by the third party, from the permission set that the consumer entity is permitted access to information computed from the data set; (9) executing the computer code on at least one computer processor to compute the analysis result from the data set after receiving the at least one consumer input; and (10) providing, by the third party, the analysis result computed from the data set to the consumer entity.

In certain implementations, the analysis result comprises a measure of jitter.

In certain implementations, the signal comprises a clock timing signal.

In accord with certain embodiments, another method consistent with certain implementations comprises (1) obtaining, by a third party, a data set, the data set derived from at least one measurement on a signal derived from an output of an electronic device, where the data set describes an analog property of the signal; (2) maintaining, by the third party, computer code that computes an analysis result from the data set; (3) connecting, by the third party, a server to a first client computer over a computer network, where the first client computer is operated by a supplier entity; (4) supplying, by the third party, a supplier user interface over the computer network to the supplier entity; (5) maintaining, by a third party, a permission set; (6) receiving, by the supplier user interface, in response to input from the supplier entity one or more supplier inputs representing a request to either create or modify the permission set to either permit or deny one or more consumer entities from accessing information computed from the data set; (7) performing, by the third party, the request to either create or modify the permission set; (8) connecting, by the third party, the server to a second client computer over the computer network; where the second client computer is operated by a consumer entity; (9) supplying, by the third party, a consumer user interface over the computer network to the consumer entity; (10) receiving, by the consumer user interface, in response to input from the consumer entity at least one consumer input representing a request to obtain the analysis result; (11) determining, by the third party, from the permission set that the consumer entity is permitted access to information computed from the data set; (12) executing, by the third party, the computer code on at least one computer processor to compute the analysis result from the data set after receiving the at least one consumer input; and (13) providing, by the consumer user interface, the analysis result computed from the data set to the consumer entity. In certain implementations, the analysis result comprises a measure of jitter. In certain implementations, the signal comprises a clock timing signal. In certain implementations, the method further comprises (14) receiving, by the third party, the electronic device; (15) performing, by the third party, the at least one measurement on the signal derived from the output of the electronic device; and (16) deriving, by the third party, the data set from the at least one measurement. In certain implementations, the analysis result comprises a measure of jitter.

In accord with certain embodiments, one or more computer-readable storage devices containing programming instructions that when executed on one or more programmed processors carry out a process consistent with certain implementations, where the programming instructions comprise: (1) instructions for computer code compatible to act upon a data set provided by a third party that computes an analysis result from the data set, the data set derived from at least one measurement on a signal derived from an output of an electronic device, where the data set describes an analog property of the signal; (2) instructions for reading the data set; (3) instructions for processing at least one supplier input from a supplier entity to either create or modify a permission set to either permit or deny one or more consumer entities from accessing information computed from the data set; (4) instructions for processing at least one consumer input from a consumer entity to receive a request to provide the analysis result; (5) instructions for determining whether the consumer entity is permitted access to information computed from the data set based on the permission set; (6) instructions for executing the computer code to compute the analysis result from the data set after processing the at least one consumer input; and (7) instructions for providing by the third party the analysis result to the consumer entity if the consumer entity is determined to have access to information computed from the data set. In certain implementations, the instructions further comprise: (8) instructions for processing a second supplier input to verify the identity of the supplier entity; and (9) instructions for processing a second consumer input to verify the identity of the consumer entity.

In certain implementations, the at least one consumer input includes at least one of the following: an electronic device identifier representing the electronic device; a data set indicator representing the data set; a temperature indicator representing a temperature condition present at least some of the time during the at least one measurement; a voltage indicator representing a voltage condition applied at least some of the time during the at least one measurement; a frequency indicator representing a frequency of oscillation for the signal; and an analysis result indicator representing a type of analysis result.

In certain implementations, the analysis result comprises a measure of jitter.

In certain implementations, the signal comprises a clock timing signal.

In certain implementations, the analysis result is derived from a first quantity and a second quantity; where the first quantity is computed from the data set; and where the analysis result includes at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity. In certain implementations, the first quantity is a first value of jitter, and the second quantity is a second value of jitter. In certain implementations, the second value of jitter is derived from a specification for jitter documented in a technical standard.

In certain implementations, the at least one consumer input comprises: a first selection representing at least one of the data set and the electronic device; and a second selection representing at least one of: a technical standard, a specification documented in a technical standard, and a limit derived from an organization.

In certain implementations, the analysis result is derived from a first quantity and a second quantity, where the first quantity is computed from the data set; where the second quantity is derived from at least one of the technical standard, the specification, and the limit; the analysis result comprising at least one of the following: (A) a magnitude comparison indicator indicating a relative magnitude of at least one of: the first quantity to the second quantity; and the second quantity to the first quantity; (B) a margin comparison indicator indicating a relative margin between at least one of: the first quantity and the second quantity; and the second quantity and the first quantity; (C) a pass/fail indicator indicating whether the first quantity is either larger or smaller than the second quantity; (D) a result based on a computation of a mathematical expression comprising the first quantity and the second quantity; and (E) a representation derived from the first quantity and the second quantity.

In certain implementations, the first quantity is a first value of jitter and the second quantity is a second value of jitter. In certain implementations, the second value of jitter is derived from a specification for jitter documented in a technical standard.

Those of skilled in the art will recognize upon consideration of the present teachings that the methods and associated data used to implement one or more embodiments can be implemented using disc storage or other forms of storage, including but not limited to Read Only Memory (ROM) devices, Random Access Memory (RAM) devices, optical storage elements, magnetic storage elements, magneto-optical storage elements, flash memory, core memory and/or other equivalent storage technologies.

Special-purpose hardware dedicated to performing the functions described herein may also be implemented. Further implementations may include software residing on a general-purpose computer, or a standalone computer that receives files or other data, and provides off-line analysis.

Those of ordinary skill in the art will recognize that one or more embodiments may be implemented using hardware components such as special-purpose hardware and/or dedicated processors, which are within the scope and spirit of the above description and in the appended claims. Similarly, custom circuits, microprocessors, general purpose computers, microprocessor based computers, microcontrollers, ASICs, and/or other dedicated hard wired logic may be used to construct alternative equivalent embodiments. Hence, the term "one or more programmed processors" should be interpreted to mean a device that is programmed or designed as a dedicated hardware device to carry out a programmed function.

Since certain changes may be made in the foregoing disclosure without departing from the scope of the embodiments herein involved, it is intended that all matter contained in the above description and depicted in the accompanying drawings be construed in an illustrative and not in a limiting sense.

Certain embodiments may be implemented using a programmed processor executing programming instructions that in certain instances are broadly described above in flow chart form that can be stored on any suitable electronic or computer readable storage medium (such as, for example, disc storage, Read Only Memory (ROM) devices, Random Access Memory (RAM) devices, network memory devices, optical storage elements, magnetic storage elements, magneto-optical storage elements, flash memory, core memory and/or other equivalent volatile and non-volatile storage technologies). However, those skilled in the art will appreciate, upon consideration of the present teaching, that the processes described above can be implemented in any number of variations and in many suitable programming languages without departing from embodiments of the present invention. For example, the order of certain operations carried out can often be varied, additional operations can be added or operations can be deleted without departing from certain embodiments of the invention. Error trapping can be added and/or enhanced and variations can be made in user interface and information presentation without departing from certain embodiments of the present invention. Such variations are contemplated and considered equivalent.

While the above description contains many specificities, these should not be construed as limitations on the scope, but rather as an exemplification of one or more preferred embodiments thereof. Many other variations are possible. Accordingly, the scope should be determined not by the embodiments illustrated, but by the appended claims and their legal equivalents. While certain illustrative embodiments have been described, it is evident that many alternatives, modifications, permutations and variations will become apparent to those skilled in the art in light of the foregoing description.

What is claimed is:

1. An apparatus, comprising:
    at least one data storage device with sufficient capacity to retain at least an analysis result, a permission set, and a data set, the data set derived from at least one measurement on a signal derived from an output of an electronic device, where the data set describes an analog property of the signal;
    a communications interface in communication with at least one of a supplier entity and a consumer entity;
    at least one programming storage device containing computer programming instructions, the computer programming instructions including:
        instructions to process at least one supplier input from the supplier entity received over the communications interface to either create or modify the permission set, where the permission set controls access by one or more consumer entities to information computed from the data set;
        instructions to process at least one consumer input from the consumer entity received over the communications interface to identify a request to provide the analysis result, the at least one consumer input comprising:
            a first selection representing at least one of the data set and the electronic device; and
            a second selection representing at least one of:
                a technical standard;
                a specification documented in a technical standard; and
                a limit derived from an organization;
        instructions to determine whether the consumer entity is permitted access to information computed from the data set based on the permission set;
        instructions to access the data set;
        instructions to compute the analysis result from the data set after processing the at least one consumer input, where the analysis result is derived from a first quantity and a second quantity;
        where the first quantity is a first value of jitter computed from the data set;
        where the second quantity is a second value of jitter derived from at least one of the technical standard, the specification, and the limit;
        the analysis result comprising at least one of the following:
            a magnitude comparison indicator indicating a relative magnitude of at least one of:
                the first quantity to the second quantity; and
                the second quantity to the first quantity;
            a margin comparison indicator indicating a relative margin between at least one of:
                the first quantity and the second quantity; and
                the second quantity and the first quantity;
            a pass/fail indicator indicating whether the first quantity is either larger or smaller than the second quantity;
            a result based on a computation of a mathematical expression comprising the first quantity and the second quantity; and
            a representation derived from the first quantity and the second quantity; and
        instructions to provide the analysis result to the consumer entity over the communications interface if the consumer entity is permitted access to information computed from the data set; and
    at least one processing unit operated by a third party and connected to the communications interface, the at least one data storage device, and the at least one programming storage device, that executes the computer programming instructions.

2. An apparatus, comprising:
    at least one data storage device with sufficient capacity to retain at least an analysis result, a permission set, and a data set, the data set derived from at least one measurement on a signal derived from an output of an electronic device, where the data set describes an analog property of the signal;
    a communications interface in communication with at least one of a supplier entity and a consumer entity;
    at least one programming storage device containing computer programming instructions, the computer programming instructions including:
        instructions to process at least one supplier input from the supplier entity received over the communications interface to either create or modify the permission set, where the permission set controls access by one or more consumer entities to information computed from the data set;
        instructions to process at least one consumer input from the consumer entity received over the communications interface to identify a request to provide the analysis result;

instructions to determine whether the consumer entity is permitted access to information computed from the data set based on the permission set;
instructions to access the data set;
instructions to compute the analysis result from the data set after processing the at least one consumer input; and
instructions to provide the analysis result to the consumer entity over the communications interface if the consumer entity is permitted access to information computed from the data set; and at least one processing unit operated by a third party and connected to the communications interface, the at least one data storage device, and the at least one programming storage device, that executes the computer programming instructions.

3. The apparatus of claim 2, where the at least one consumer input comprises an electronic device identifier representing the electronic device.

4. The apparatus of claim 2, where the analysis result comprises a measure of phase noise.

5. The apparatus of claim 2, where the analysis result comprises a pass/fail indicator.

6. The apparatus of claim 2, where the analysis result comprises a measure of jitter.

7. The apparatus of claim 6, where the signal comprises a clock timing signal.

8. The apparatus of claim 2, where the analysis result is derived from a first quantity and a second quantity;
where the first quantity is computed from the data set; and
where the analysis result comprises a pass/fail indicator indicating whether the first quantity is either larger or smaller than the second quantity.

9. The apparatus of claim 8, where the first quantity is a first value of jitter, and the second quantity is a second value of jitter.

10. The apparatus of claim 9, where the second value of jitter is derived from a specification for jitter documented in a technical standard.

11. The apparatus of claim 9, where the second value of jitter is derived from the consumer entity.

12. A method, comprising:
obtaining, by a third party, a data set, the data set derived from at least one measurement on a signal derived from an output of an electronic device, where the data set describes an analog property of the signal;
maintaining, by the third party, a permission set based on data received from a supplier entity, where one or more consumer entities having permission as determined by the permission set are permitted access to information computed from the data set;
maintaining, by the third party, computer code that computes an analysis result from the data set;
receiving, by the third party, at least one consumer input from a consumer entity, where the at least one consumer input represents a request to obtain the analysis result;
determining, by the third party, from the permission set that the consumer entity is permitted access to information computed from the data set;
executing the computer code on at least one computer processor to compute the analysis result from the data set after receiving the at least one consumer input; and
providing, by the third party, the analysis result computed from the data set to the consumer entity.

13. The method of claim 12, where the at least one consumer input comprises an electronic device identifier representing the electronic device.

14. The method of claim 12, where the analysis result comprises a measure of phase noise.

15. The method of claim 12, where the analysis result comprises a pass/fail indicator.

16. The method of claim 12, where the analysis result comprises a measure of jitter.

17. The method of claim 16, where the signal comprises a clock timing signal.

18. The method of claim 12, where the analysis result is derived from a first quantity and a second quantity;
where the first quantity is computed from the data set; and
where the analysis result comprises a pass/fail indicator indicating whether the first quantity is either larger or smaller than the second quantity.

19. The method of claim 18, where the first quantity is a first value of jitter, and the second quantity is a second value of jitter.

20. The method of claim 19, where the second value of jitter is derived from a specification for jitter documented in a technical standard.

21. The method of claim 19, where the second value of jitter is derived from the consumer entity.

22. The method of claim 12, where the at least one consumer input comprises:
a first selection representing at least one of the data set and the electronic device; and
a second selection representing at least one of:
a technical standard;
a specification documented in a technical standard; and
a limit derived from an organization.

23. The method of claim 22, where the analysis result is derived from a first quantity and a second quantity,
where the first quantity is computed from the data set;
where the second quantity is derived from at least one of the technical standard, the specification, and the limit;
the analysis result comprising at least one of the following:
a magnitude comparison indicator indicating a relative magnitude of at least one of:
the first quantity to the second quantity; and
the second quantity to the first quantity;
a margin comparison indicator indicating a relative margin between at least one of:
the first quantity and the second quantity; and
the second quantity and the first quantity;
a pass/fail indicator indicating whether the first quantity is either larger or smaller than the second quantity;
a result based on a computation of a mathematical expression comprising the first quantity and the second quantity; and
a representation derived from the first quantity and the second quantity.

24. The method of claim 23, where the first quantity is a first value of jitter and the second quantity is a second value of jitter.

25. The method of claim 24, where the second value of jitter is derived from a specification for jitter documented in a technical standard.

26. The method of claim 24, where the second value of jitter is derived from the consumer entity.

27. The method of claim 12, and the method further comprising:
receiving, by the third party, the electronic device;
performing, by the third party, the at least one measurement on the signal derived from the output of the electronic device; and
deriving, by the third party, the data set from the at least one measurement.

28. The method of claim 27, where the analysis result comprises a measure of jitter.

29. The method of claim 28, where the signal comprises a clock timing signal.

30. A method, comprising:
obtaining, by a third party, a data set, the data set derived from at least one measurement on a signal derived from an output of an electronic device, where the data set describes an analog property of the signal;
maintaining, by the third party, computer code that computes an analysis result from the data set;
connecting, by the third party, a server to a first client computer over a computer network, where the first client computer is operated by a supplier entity;
supplying, by the third party, a supplier user interface over the computer network to the supplier entity;
maintaining, by a third party, a permission set;
receiving, by the supplier user interface, in response to input from the supplier entity one or more supplier inputs representing a request to either create or modify the permission set to either permit or deny one or more consumer entities from accessing information computed from the data set;
performing, by the third party, the request to either create or modify the permission set;
connecting, by the third party, the server to a second client computer over the computer network; where the second client computer is operated by a consumer entity;
supplying, by the third party, a consumer user interface over the computer network to the consumer entity;
receiving, by the consumer user interface, in response to input from the consumer entity at least one consumer input representing a request to obtain the analysis result;
determining, by the third party, from the permission set that the consumer entity is permitted access to information computed from the data set;
executing, by the third party, the computer code on at least one computer processor to compute the analysis result from the data set after receiving the at least one consumer input; and
providing, by the consumer user interface, the analysis result computed from the data set to the consumer entity.

31. The method of claim 30, where the analysis result comprises a measure of jitter.

32. The method of claim 31, where the signal comprises a clock timing signal.

33. The method of claim 30, and the method further comprising:
receiving, by the third party, the electronic device;
performing, by the third party, the at least one measurement on the signal derived from the output of the electronic device; and
deriving, by the third party, the data set from the at least one measurement.

34. The method of claim 33, where the analysis result comprises a measure of jitter.

35. One or more computer-readable storage devices containing programming instructions that when executed on one or more programmed processors carry out a process, where the programming instructions comprise:
instructions for computer code compatible to act upon a data set provided by a third party that computes an analysis result from the data set, the data set derived from at least one measurement on a signal derived from an output of an electronic device, where the data set describes an analog property of the signal;
instructions for reading the data set;
instructions for processing at least one supplier input from a supplier entity to either create or modify a permission set to either permit or deny one or more consumer entities from accessing information computed from the data set;
instructions for processing at least one consumer input from a consumer entity to receive a request to provide the analysis result;
instructions for determining whether the consumer entity is permitted access to information computed from the data set based on the permission set;
instructions for executing the computer code to compute the analysis result from the data set after processing the at least one consumer input; and
instructions for providing by the third party the analysis result to the consumer entity if the consumer entity is determined to have access to information computed from the data set.

36. The one or more computer-readable storage devices of claim 35, and the instructions further comprise:
instructions for processing a second supplier input to verify the identity of the supplier entity; and
instructions for processing a second consumer input to verify the identity of the consumer entity.

37. The one or more computer-readable storage devices of claim 35, where the at least one consumer input comprises an electronic device identifier representing the electronic device.

38. The one or more computer-readable storage devices of claim 37, where the analysis result comprises a measure of jitter.

39. The one or more computer-readable storage devices of claim 38, where the signal comprises a clock timing signal.

40. The one or more computer-readable storage devices of claim 35, where the analysis result is derived from a first quantity and a second quantity;
where the first quantity is computed from the data set; and
where the analysis result comprises a pass/fail indicator indicating whether the first quantity is either larger or smaller than the second quantity.

41. The one or more computer-readable storage devices of claim 40, where the first quantity is a first value of jitter, and the second quantity is a second value of jitter.

42. The one or more computer-readable storage devices of claim 41, where the second value of jitter is derived from a specification for jitter documented in a technical standard.

43. The one or more computer-readable storage devices of claim 35, where the at least one consumer input comprises:
a first selection representing at least one of the data set and the electronic device; and
a second selection representing at least one of:
a technical standard;
a specification documented in a technical standard; and
a limit derived from an organization.

44. The one or more computer-readable storage devices of claim 43, where the analysis result is derived from a first quantity and a second quantity,
where the first quantity is computed from the data set;
where the second quantity is derived from at least one of the technical standard, the specification, and the limit;
the analysis result comprising at least one of the following:
a magnitude comparison indicator indicating a relative magnitude of at least one of:
the first quantity to the second quantity; and
the second quantity to the first quantity;
a margin comparison indicator indicating a relative margin between at least one of:
the first quantity and the second quantity; and the second quantity and the first quantity;
a pass/fail indicator indicating whether the first quantity is either larger or smaller than the second quantity;
a result based on a computation of a mathematical expression comprising the first quantity and the second quantity; and
a representation derived from the first quantity and the second quantity.

45. The one or more computer-readable storage devices of claim 44, where the first quantity is a first value of jitter and the second quantity is a second value of jitter.

46. The one or more computer-readable storage devices of claim 45, where the second value of jitter is derived from a specification for jitter documented in a technical standard.

* * * * *